(12) United States Patent
Petromanolakis et al.

(10) Patent No.: US 9,205,892 B2
(45) Date of Patent: Dec. 8, 2015

(54) HYDRODYNAMIC DUCT OF FLOW MANAGEMENT AT THE BOW OF A VESSEL

(75) Inventors: E. Emmanuel Petromanolakis, Palaio Faliro Attikis (GR); E. Kalomoira Petromanolakis, Palaio Faliro Attikis (GR); E. Evagelos Petromanolakis, Palaio Faliro Attikis (GR)

(73) Assignee: MILAN SHIPPING AND INVESTMENT LIMITED, Ajeltake Island, Majuro (MH)

( * ) Notice: Subject to any disclaimer, the term of this patent is extended or adjusted under 35 U.S.C. 154(b) by 0 days.

(21) Appl. No.: 14/234,374

(22) PCT Filed: Jul. 16, 2012

(86) PCT No.: PCT/GR2012/000032
§ 371 (c)(1),
(2), (4) Date: Jan. 22, 2014

(87) PCT Pub. No.: WO2013/011332
PCT Pub. Date: Jan. 24, 2013

(65) Prior Publication Data
US 2014/0150704 A1     Jun. 5, 2014

(30) Foreign Application Priority Data

Jul. 18, 2011   (GR) .............................. 20110100430

(51) Int. Cl.
*B63B 1/24*     (2006.01)
*B63B 1/26*     (2006.01)
*B63B 1/40*     (2006.01)

(52) U.S. Cl.
CPC . *B63B 1/40* (2013.01); *Y02T 70/125* (2013.01)

(58) Field of Classification Search
CPC .................................................... Y02T 70/125
USPC .................................. 114/271, 274, 278, 288
See application file for complete search history.

(56) References Cited

U.S. PATENT DOCUMENTS 1,258,554 A * 3/1918 Furness ........................ 114/67 R
1,859,139 A * 5/1932 Hanlon ........................ 114/67 R
(Continued)

FOREIGN PATENT DOCUMENTS

| DE | 931 090 | 8/1955 |
| FR | 1017897 | 12/1952 |
| JP | H05-026786 | 4/1993 |
| KR | 10-0444426 | 11/2004 |

(Continued)

OTHER PUBLICATIONS

KIPO Official Action, Korean Application No. 10-2014-7003988, dated May 27, 2014.

Primary Examiner — Daniel V Venne

(57) ABSTRACT

Hydrodynamic duct mounted at the bow of a vessel, comprising a horizontal wall portion (1) and two lateral wall portions (2,3), whereby the flow through the duct acquires substantially different characteristics from the flow outside it and thereby wave making and frictional resistances are reduced and the fuel conventionally required for the propulsion of the vessel is reduced accordingly. The duct is arranged with the Center of Low Pressure (1c) corresponding to a zero angle of attack onto the horizontal wall portion (1) being located in the region of generation of the first bow wave and with the Centers of Low Pressure (2c,3c) of the lateral wall portions (2,3) in the region of connection thereof with the horizontal wall portion (1) being located in a selected position between the Center of Low Pressure (1c) and up to or slightly forwardly the leading edge (1a) of the horizontal wall portion (1).

22 Claims, 12 Drawing Sheets

(56) References Cited

U.S. PATENT DOCUMENTS

| | | | |
|---|---|---|---|
| 2,649,266 A * | 8/1953 | Georges | 244/130 |
| 2,767,678 A * | 10/1956 | Vertens | 114/274 |
| 5,566,634 A * | 10/1996 | Petromanolakis | 114/61.27 |
| 2014/0150704 A1* | 6/2014 | Petromanolakis et al. | 114/274 |

FOREIGN PATENT DOCUMENTS

| | | |
|---|---|---|
| KR | 20-2011-0001506 | 2/2011 |
| WO | 82/03055 | 9/1982 |
| WO | 96/26104 | 8/1996 |
| WO | 2005/023634 | 3/2005 |

* cited by examiner

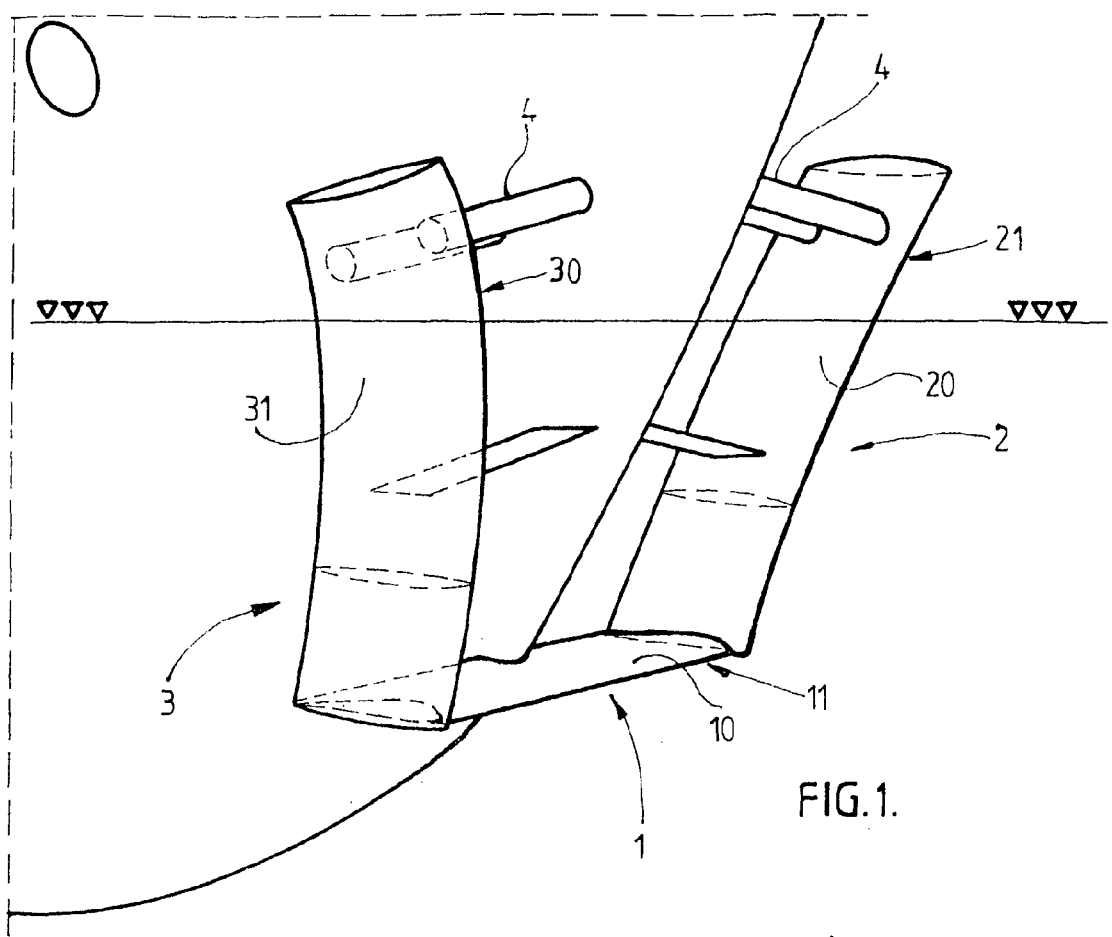
FIG.1.
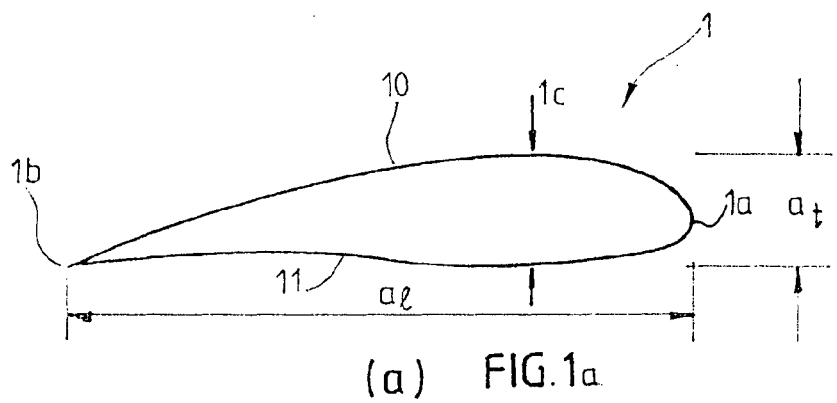
(a) FIG.1a
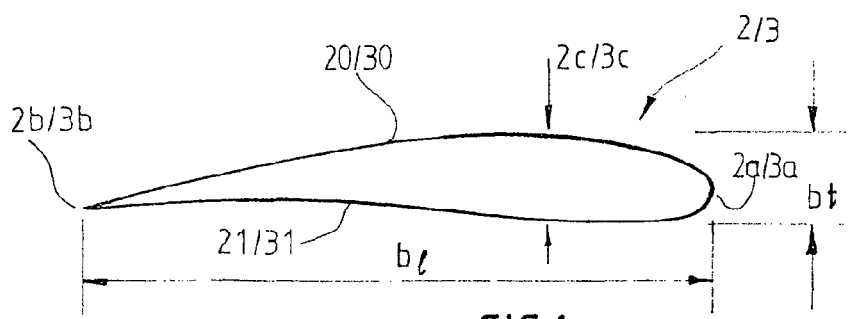
(b) FIG.1b

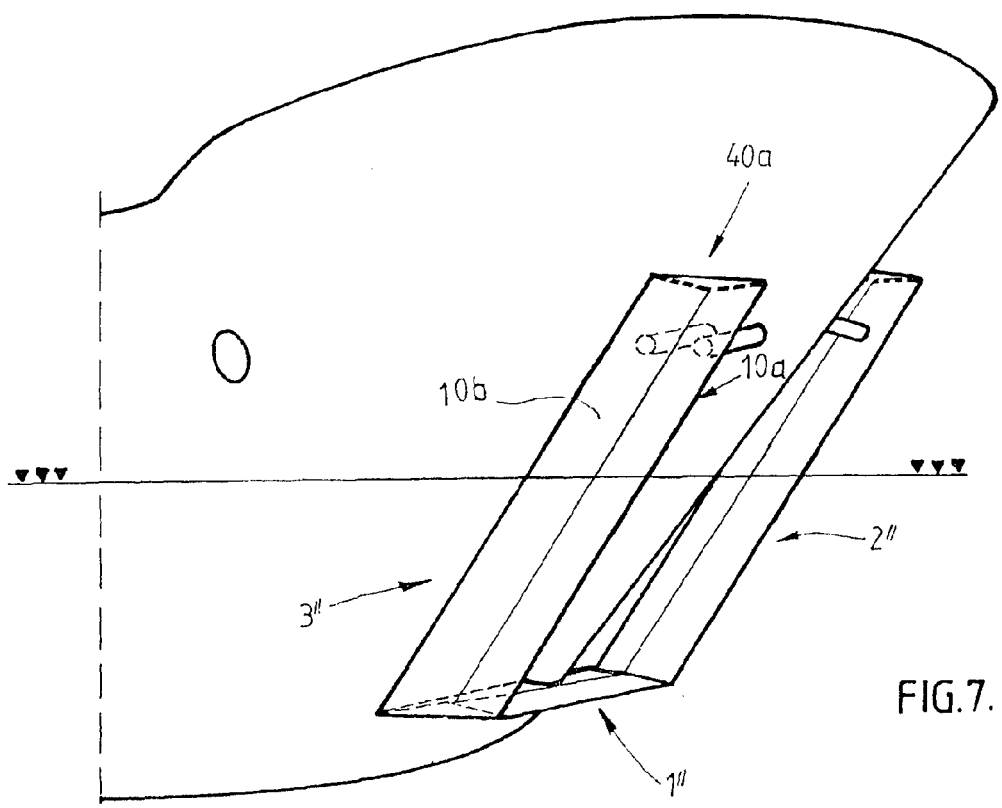
FIG. 7.
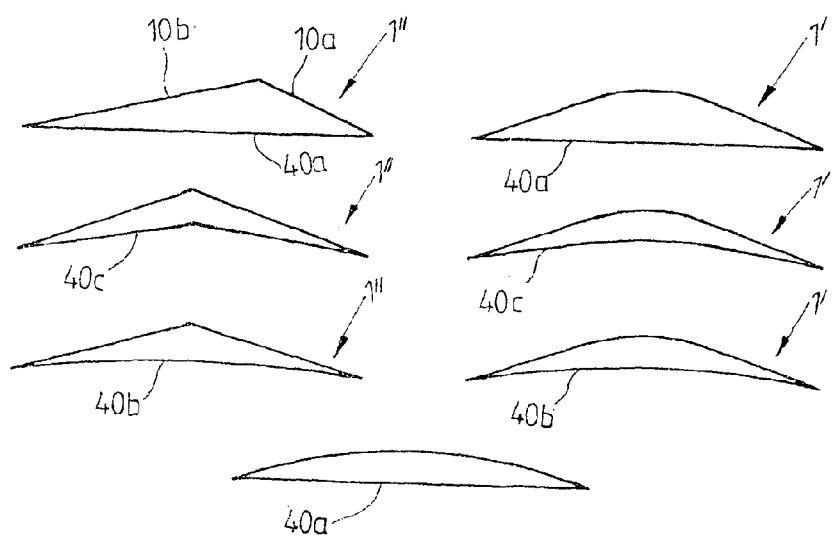
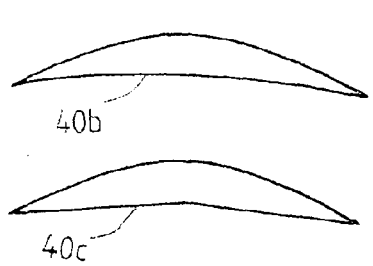
FIG. 7a.

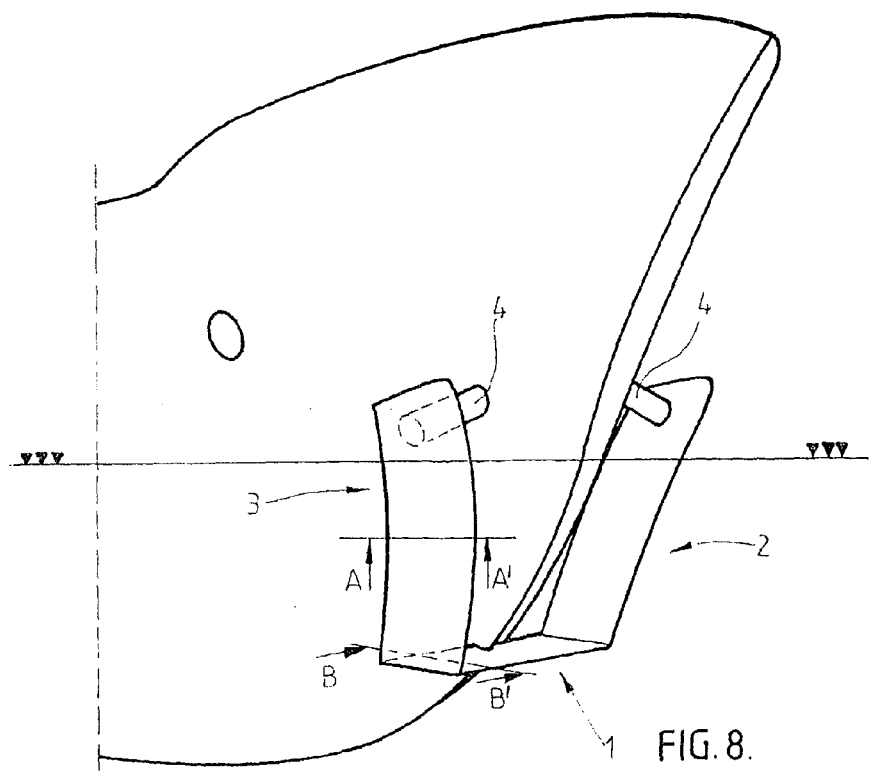
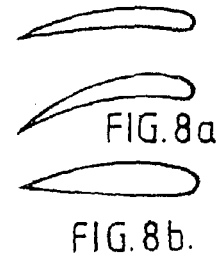
FIG. 8a
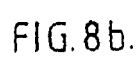
FIG. 8b.
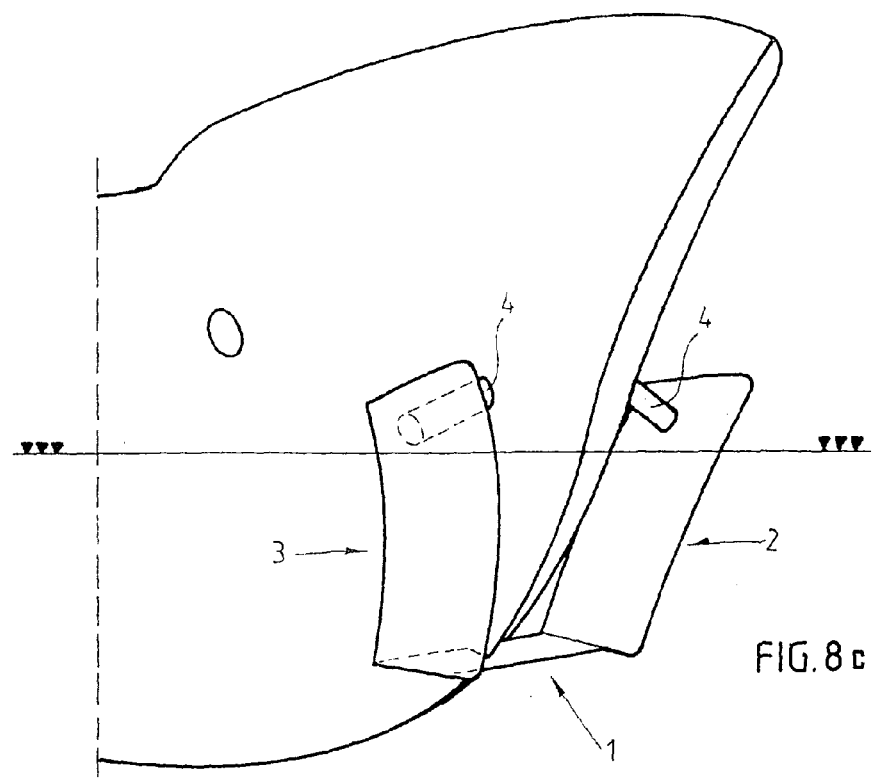
FIG. 8c

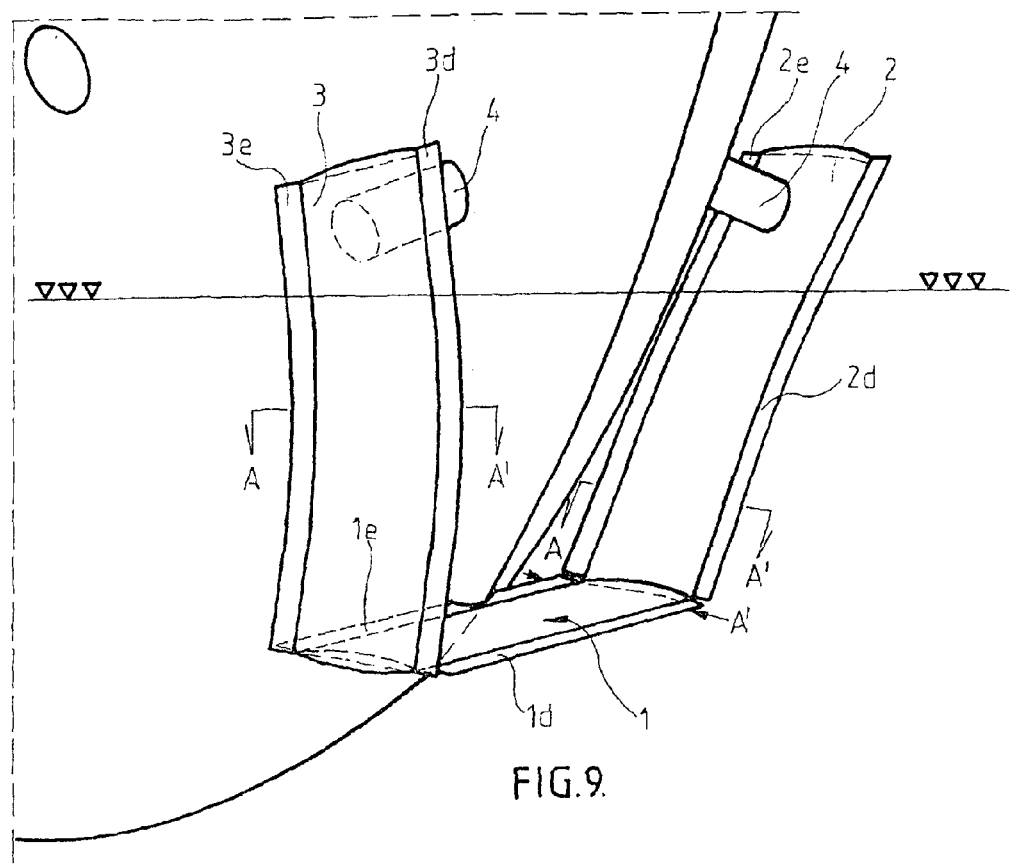
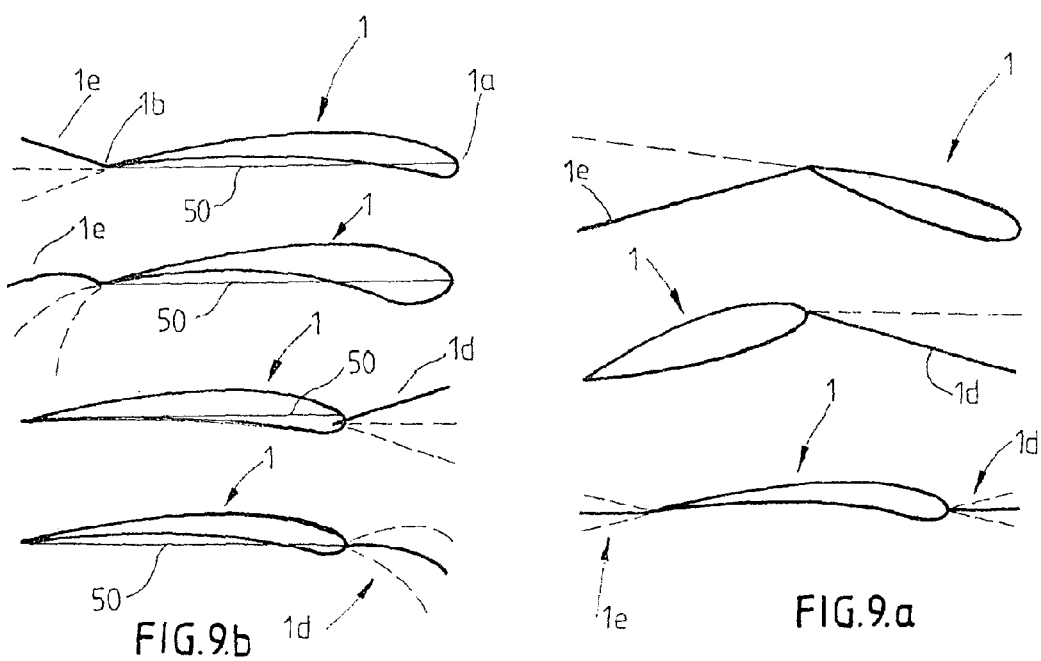

HYDRODYNAMIC DUCT OF FLOW MANAGEMENT AT THE BOW OF A VESSEL

THE FIELD OF THE ART

The present invention refers to the field of the art of hydrodynamics, particularly relating to a hydrodynamic duct mounted at the bow of a vessel, which comprises a horizontal wall portion and two lateral wall portions thereby defining a flow space at the bow of the vessel within the duct with different characteristics from the flow outside the duct resulting in the reduction of wave making and frictional resistances and in the consequent reduction of the conventionally required fuel consumption for the propulsion of the vessel.

THE BACKGROUND OF THE INVENTION

In the field of the art of building of vessels of all types, the reduction of the energy consumed for the propulsion thereof acquires an ever increasing importance in the context of global economic crisis and worsening environmental problems.

Wave making and frictional resistances constitute important parameters that determine fuel consumption during cruising of a vessel. The reduction of frictional resistance and wave making resistance experienced by vessels and the resulting improvement of their sliding through the fluid mass of water that they encounter is therefore the subject of ever lasting efforts. By way of example, the configuration of the stem section of the vessel's hull in the shape of a bulb or in the shape of a ball has been widely used in the past for the reduction of the wave-making resistance and in particular the reduction of the height of the wave generated at the bow of the vessel.

However, the frontal surface of the vessel, i.e. the extensive surface of the bow that is involved in the process of opening a propulsion path through the water surface during propulsion of the vessel is a wide surface with a surface area much more extensive than that covered by the bulb and taking into consideration that the resistance to propulsion is proportional to the square of the speed of the vessel, the horsepower required to confront this resistance and afford cruising of the vessel at the nominal design speed is correspondingly increased.

With a scope of confronting this problem and to reduce the propulsion resistance and accordingly the energy consumed in overcoming wave making resistance that is encountered by the frontal surface of the bow of the vessel, WO-92/22456 of E. E. Petromanolakis has proposed in the past the mounting of a duct at the bow of the vessel, such duct extending at a height above and below the waterline of the vessel and adapted to achieve the reduction of wave generation during propulsion of the vessel as the vessel strikes onto the mass of water body through the abovementioned duct at the bow and not through its entire frontal surface. However, such a wave making energy absorbing duct was not possible to render optimal benefits because the differentiation of flow through the duct in relation to the sea water flow in the surrounding frontal surface of the vessel was rather inadequate. Other attempts of the prior art, such as the French Patent FR-A-1 017 897 had undesirable results, since they not only were not achieving a significant reduction in wave making resistance during the propulsion of the vessel, but they also included mobile portions, which required additional supply of energy from the engine of the vessel and therefore the cost-benefit relationship was unacceptable. Another attempt to manage the sea water flow at the bow of a vessel was disclosed in WO-A-82 03055 (SEE) in which a duct was proposed adapted to lead water from the stem to the stern of the vessel with a scope of its exploitation therein for providing motion to rotatable members, such idea being of a totally distinct philosophy, whilst it is also extremely doubtful whether it can be actually implemented due to frictions, turbulences, etc.

It is therefore a main object of the present invention to efficiently overcome the aforementioned drawbacks and deficiencies of the prior art and to propose structural design parameters of the stem hydrodynamic duct which will allow optimization of the performance thereof. In particular selective combinations are being proposed in the manufacturing parameters of the horizontal wall portion and of the lateral wall portions of the duct, wherein those parameters in the geometry of the wall portions of the duct, which determine the lift coefficient $C_L$ and drag coefficient $C_D$ are being considered with a scope of obtaining optimization of the ratio $C_L/C_D$ for both the horizontal and for the lateral wall portions of the duct, as well as of obtaining optimization of the ratio of the lift coefficient $C_L$ of the horizontal wall to the lift coefficient $C_L$ of the lateral walls of the duct in correspondence with the specific nominal speed of propulsion of the vessel and the geometry of the bow.

On the basis of the parameters being investigated, it becomes possible in all cases of different types of vessels to provide the optimal solution of duct design so as to achieve the best results in the advantageous differentiation of the flow within the duct in relation to the flow in the surroundings outside it and accordingly to achieve a reduced resistance in the propulsion of the vessel with a consequent reduction of fuel consumption.

With a scope of obtaining the above desirably advantageous characteristics, the hydrodynamic duct proposed in the present invention is being arranged with the Center of Low Pressure corresponding to a zero angle of attack onto the horizontal wall portion being located in the region of generation of the first bow wave and with the Centers of Low Pressure of the lateral wall portions in the region of connection thereof with the horizontal wall portion being located in a selected position between the Center of Low Pressure and up to or slightly forwardly the leading edge of the horizontal wall portion.

All these and other objects, characteristics and advantages of the present invention will become apparent in the detailed description herein below.

BRIEF DESCRIPTION OF THE DRAWINGS

The invention will be fully disclosed to those skilled in the art, by reference to the accompanying drawings, in which are being depicted illustrative, yet not restrictive embodiments of the invention.

FIG. 1 presents a perspective view of a first illustrative embodiment of the duct of the invention, in which both the horizontal wall portion and the lateral wall portions have an airfoil section, wherein the duct is mounted at the bow of the vessel with a scope of reducing the wave making and frictional resistances, thereby subsequently reducing the fuel required for the propulsion of the vessel.

FIGS. 1a and 1b respectively show a sectional view of the airfoil section employed in the horizontal wall portion and of the airfoil section employed in the lateral wall portions of the duct depicted in FIG. 1.

FIG. 5b shows the acute angle configuration of the plate corresponding to the horizontal wall portion and the plates corresponding to the lateral wall portions of the duct depicted in FIGS. 5, 5a.

FIG. 7 presents an illustrative configuration of the duct having wall portions with an acute angle section, wherein a further plate member is employed to close the external side thereof.

FIG. 7a shows a variety of configurations of the plate member adapted to close the external side of the duct having wall portions with an acute angle section as in FIG. 7 or of a duct having wall portions with a curved plate configuration as in FIG. 4, wherein such closing plate member may have a linear, curved or acute angle form.

FIG. 8 presents a duct with the horizontal wall portion and the lateral wall portions having identical lengths.

FIG. 8a shows alternative configurations of the cross sectional view A-A' denoted in FIG. 8.

FIG. 8b shows the cross sectional view B-B" denoted in FIG. 8.

FIGS. 8c and 8d correspondingly present a duct with lateral wall portions longer than the horizontal wall portion and a duct with lateral wall portions shorter than the horizontal wall portion.

FIG. 9 presents an illustrative embodiment of the invention wherein both the horizontal wall portion and also the lateral wall portions are being provided with a leading edge and a trailing edge guide plate extension.

FIG. 9a shows illustrative sectional views of the horizontal wall portion of FIG. 9 incorporating a guide plate extension projecting forwardly thereof and/or a guide plate extension projecting rearwardly thereof.

FIG. 9b illustratively presents the linear portion that represents the chord in various illustrative airfoil sections.

DETAILED DESCRIPTION OF PREFERRED EMBODIMENTS

Referring now to the accompanying drawings, we will describe illustrative, non restrictive embodiments of the invention.

The proposed hydrodynamic duct generates the result of reduction of wave making and frictional resistances encountered during propulsion of a vessel and to this end it is being mounted at the bow of the vessel at a location such as to ensure immersion of the horizontal wall portion thereof within the water, underneath the sea surface. The duct comprises a horizontal wall portion (1) and a pair of lateral wall portions (2, 3), the lateral wall portions (2, 3) being connected to the horizontal wall portion (1) and extending upwardly on either side of the bow, maintaining a fixed equal distance from the sides of the bow and to this end following the curved configuration of such sides of the bow and forming, together with the horizontal wall portion (1) and with the surface of the bow to which they are connected by means of supporting pillars (4), an area of water flow within the duct completely differentiated from the water flow outside it.

Figure 2:
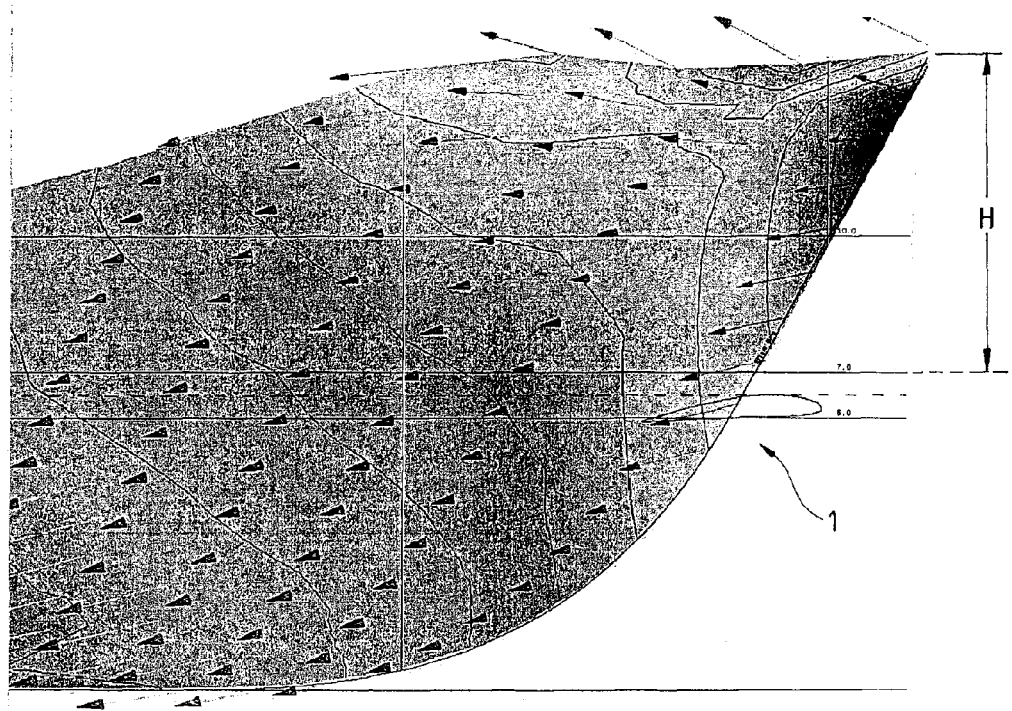
FIG. 2 presents an illustrative diagram of the wave making and friction vectors at the bow of a cruising vessel as derived from a CFD study.
Figure 2A:
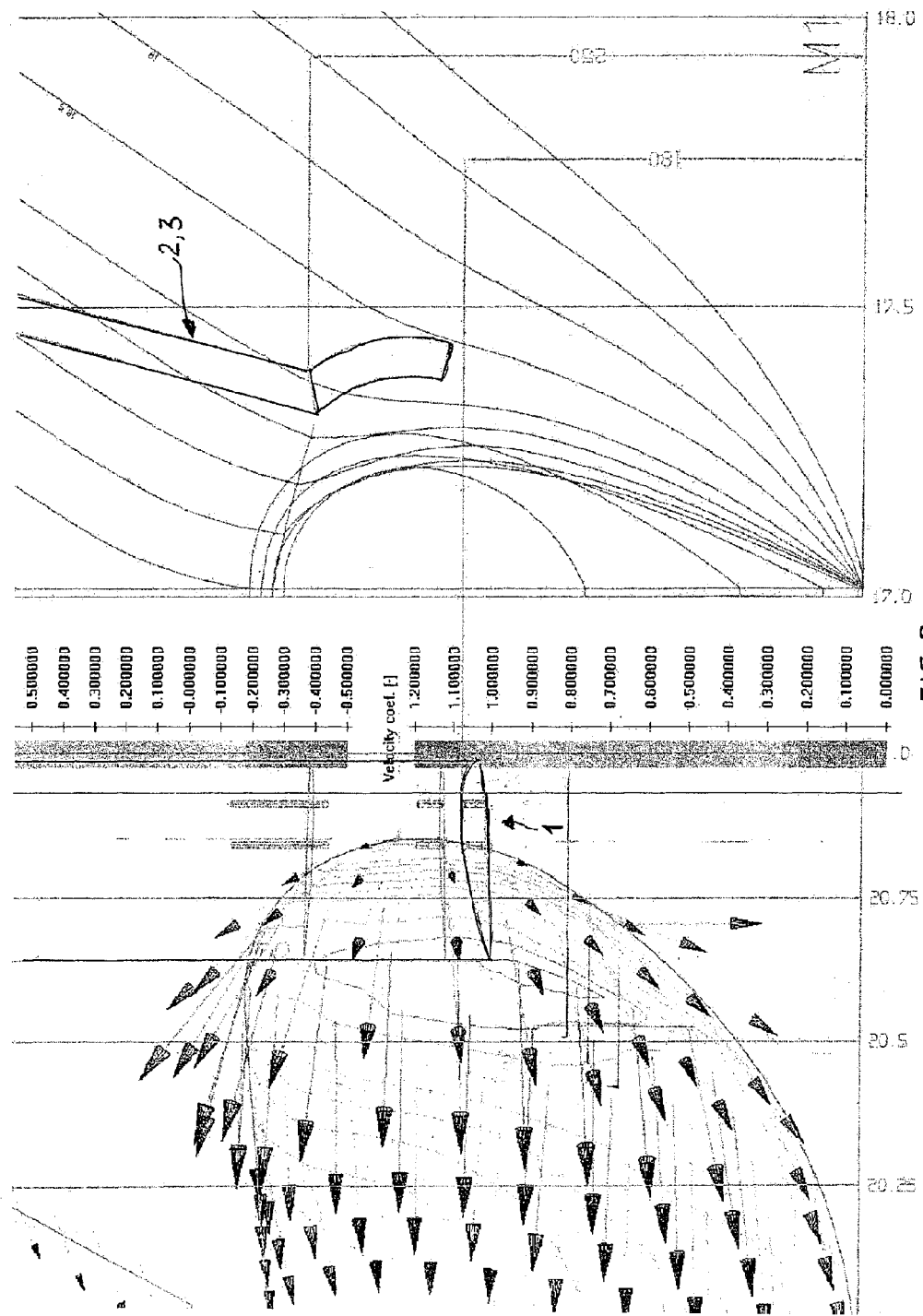
FIG. 2a shows an illustrative diagram of the wave making and friction vectors around a bulb provided at the bow of a vessel equipped with the duct of the invention having both the horizontal and the lateral wall portions with an airfoil section.

The positioning of the horizontal wall portion (1) in order to achieve an optimal performance of the duct with a differentiation of water flow therein is such as to effect orientation thereof beneath the region of the pressures being exerted during propulsion onto the bow, as presented in the accompanying FIG. 2, wherein at this position the majority of wave making and friction pressure applying vectors onto the bow of the vessel are being contained within the duct. The draught of the duct is defined to be the distance of the uppermost point at the upper surface of the horizontal wall portion from the waterline and, as mentioned herein above, the horizontal wall portion is located downwardly the region of maximal pressures exerted onto the bow, such region being indicated by height H depicted in FIG. 2. Similarly as shown in FIG. 2a in the bow of a vessel provided with a bulb, the horizontal wall portion of the duct of the invention is again positioned at a position wherein the majority of wave making and some of the friction pressure applying vectors onto the bow of the vessel are being contained within the duct, this position being located marginally under the stagnation point of the flow impacting onto the bulb, such stagnation point being the point of the bow whereupon the flow exerts a maximum pressure onto the bow and its speed is zero. The hydrodynamic section diagram, adjacently to the diagram of the wave making and friction pressure applying vectors acting onto the bulb, illustratively shows the configuration of the lateral wall portions of the duct that have a curved portion at the region of the bulb and thereafter a linear portion rising upwardly inclined at an angle corresponding to the angle of the sides of the bow.

The abovementioned differentiation of the flow characteristics within the duct from the characteristics of the flow outside of the duct results in the improvement of the cruising characteristics of the vessel, which, as defined hereinabove, consist in the reduction of the wave making and frictional resistances and consequently in affording a capacity of saving of fuel consumed in the propulsion of vessel, such reduced fuel consumption having obvious economic and environmental advantages.

The region of exertion of pressures onto the bow, as indicated by the height H in. FIG. 2, underneath which is being mounted the horizontal wall portion of the duct, is this region of water flow wherein the creation of wave making resistance ($C_w$) and frictional resistance (CO takes place also including a part of the flow that functions as a mere frictional flow ($C_f$) acting onto the vessel. Therefore the duct of the invention improves the wave making coefficient ($C_w$), as well as the friction coefficient ($C_f$). The abovementioned improvement has been proved from tests carried out within tanks adapted for the testing of vessel models (towing tank tests), wherein were tested vessel models with a conventional bow and nominal speeds of 14-15 knots, 18-20 knots and 30 knots, as well as vessel models with a bulb and a nominal speed of 14.5-15.5 knots. In the case of the vessel model with the bulb, the upper surface of the horizontal wall portion was mounted at a distance of approximately one meter underneath the region of local zero speed, i.e. the stagnation point of the bulb that is the point of zero speed of the fluid flowing onto the bulb. Considering the reference of the waterline under conditions of calm sea, this stagnation point is the point at the bow of the vessel wherein separation of the flow speed vectors takes place into those flow speed vectors with an upward direction that operate to produce wave making and friction onto the hull and those flow speed vectors with a downward direction that operate to produce mere friction onto the hull. In the case of a vessel model with a nominal high speed of 30 knots, the upper surface of the horizontal wall portion of the duct was during tests mounted at a position such as to lie underneath the upwardly directed wave making generating vectors (the keel being always taken to be the reference point), as well as underneath those vectors in a direction parallel to the keel and underneath a part of the downwardly directed solely friction generating vectors, with a scope of obtaining an optimal performance of the duct. Therefore within the duct is being included the flow that produces wave making and friction simultaneously and part of the flow that produces exclusively friction onto the hull. Generally, the overall herein proposed stem duct may be shifted either forwardly or rearwardly depending on the speed of the vessel in order to achieve optimal results.

In conventional bows with a scope of obtaining positive results, the length of the duct is such as to effect coverage, entirely or partially, of the surface area of the bow whereupon pressures are being exerted. Indicative results for vessels with a conventional bow are presented in Tables 2-4. Similarly for those types of vessels with bulbs that extend up to the waterline or in the vicinity of the waterline, the duct covers regions of frontal pressures and lateral backpressures if any, contributing also to energy saving as it illustratively becomes apparent from the experimental test results presented in Table 1. The determination of the abovementioned regions of frontal pressures and of lateral backpressures can be obtained through a CFD (Computational Fluid Dynamics) study, the data obtained from such study being thereafter confirmed through tests in a water tank of model vessels.

As illustratively presented in FIG. 1, the horizontal wall portion (1) of the duct has a section (a) of a specified geometry depicted in FIG. 1a, which section (a) has a length ($a_l$) in the direction of flow and a thickness ($a_t$), whilst the lateral wall portions (2, 3) have a section (b) of a specified geometry depicted in FIG. 1b, such section (b) having a length ($b_l$) in the direction of flow and a thickness ($b_t$). The dimensions of length and thickness vary depending on the varying configuration of the wall portions. Indicatively, section (a), as well as section (b) is an airfoil section, either an identical airfoil section for both sections (a) and (b), or a different airfoil section for sections (a) and (b) depending on the lift coefficient requirements of the wall portions, the main parameters for the selection of the airfoil sections being the speed of the vessel and the geometry of the bow.

The horizontal wall portion (1) extends on either side of the bow line with an upper duct-internal surface (10) and a bottom duct-external surface (11), whilst the lateral wall portions (2, 3) being connected to the horizontal wall portion (1) are respectively provided with a duct-internal surface (20, 30) and a duct-external surface (21, 31) outside of the duct. The section (a) of the horizontal wall portion (1) and the section (b) of the lateral wall portions (2, 3) are being arranged with their leading edge (1a) and (2a, 3a) correspondingly at a frontal end of the flow entering the duct and their trailing edges (1b) and (2b, 3b) respectively at a rear end of the flow exiting the duct.

The distances of the lateral wall portions (2, 3) from the sides of the bow of the vessel, which are herein defined as the distances of the trailing edges (2b, 3b) from the sides of the bow, determine the position of the lateral wall portions in association with the angles of attack of the flow entering the duct. The distance of the lateral wall portions (2, 3) from the bow sides may vary depending on the vessel's speed, the bow geometry and the type of the lateral wall portions and can take values ranging from 0.30 to 10.00 m.

The horizontal wall portion (1) may be parallel to the waterline or at a certain inclination with respect to the waterline in calm sea, wherein the angle of attack of the horizontal wall portion (1) is a function of the speed of the vessel and of the type of the airfoil section being used, whilst the angle of attack of the lateral wall portions (2, 3) is a function of the speed of the vessel, the bow geometry and the type of the airfoil section being used in making these lateral wall portions.

As mentioned herein above, the lateral wall portions follow the geometry of the bow in the keel-to-deck direction, remaining always parallel to the sides of the bow of the vessel and at a constant distance from these sides, wherein the lateral wall portions extend at any suitable angle with respect to the waterline and they are preferably parallel to the waterline as the flow around the vessel also is parallel to the waterline, so that during cruising that involves pitching, the designed wall portion of optimal efficiency might have the least possible geometrical differentiations thereby maintaining a substantially constant performance, with the leading edges (2a, 3a) thereof following the inclination of the bow line, wherein such bow line may be perpendicular to the waterline or inclined at any angle whatsoever with respect to the waterline.

Figure 3:
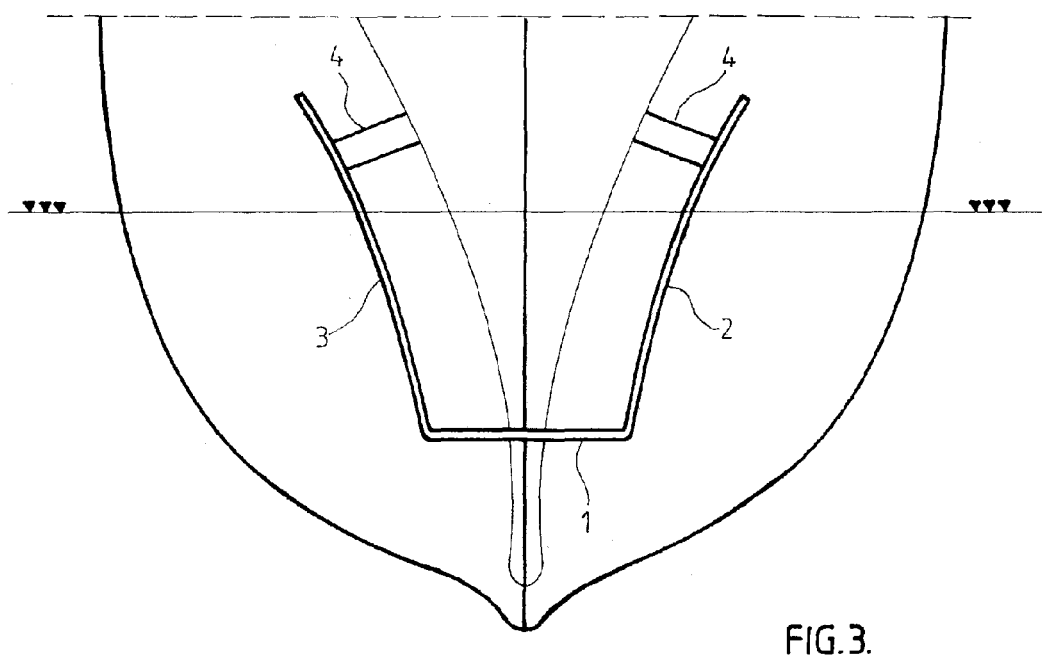
FIG. 3 presents an embodiment of the duct of the invention, wherein the lateral wall portions of the duct, whilst generally extending in a vertical direction up to a certain height measured in a direction perpendicularly above or below the waterline, they are being adapted to follow the inclination of the bow line or any other inclination above the abovementioned certain height.

According to one preferred embodiment of the invention shown in FIG. 3, the lateral wall portions (2, 3) of the duct whilst generally extending in a vertical direction up to a certain height measured in a direction perpendicularly to the waterline and above or below the waterline, they are being adapted to follow the inclination of the bow line or any other inclination above the abovementioned certain height.

The section of the lateral wall portions (2, 3), as well as of the horizontal wall portion (1) may remain constant thereby maintaining the same geometry throughout the length of the wall portions or of any portion thereof, or it might change along the length thereof.

According to a preferred illustrative embodiment of the invention, the specified geometrical configuration of section (a) of the horizontal wall portion (1) and/or the specified geometrical configuration of section (b) of the lateral wall portions (2, 3) is an airfoil section arranged with the trailing edge thereof (1a) and (2a, 3a) respectively at a frontal end of the flow inlet into the duct, and the trailing edge thereof (1b) and (2b, 3b) respectively at a rear end of the flow outlet from the duct.

A specific characteristic of the duct of the invention is that the Center of Low Pressure (1c) of the horizontal wall portion (1) having a section (a) of a specified geometrical form is, in correspondence with each appropriately selected angle of attack of the flow impacting onto the upper duct-internal surface (10) thereof, being arranged in the region of generation of the first bow wave, i.e. onto the bow line or marginally forwardly thereof. On the other hand, the Centers of Low Pressure (2c, 3c) of the lateral wall portions (2, 3) at the region of connection of the lateral wall portions (2, 3) with the horizontal wall portion (1), having a section (b) of a specified geometrical form are, in correspondence with each appropriately selected angle of attack of the flow impacting onto the duct-internal surfaces (20, 30) thereof, being arranged in a selected position located in between the Center of Low Pressure (1c) of the horizontal wall portion (1) and the leading edge (1a) of the horizontal wall portion (1) or even projecting forwardly this leading edge (1a), wherein the lateral wall portions (2, 3) are in all circumstances manufactured at a suitable length so as to obtain coincidence of the trailing edges (2b, 3b) of the lateral wall portions (2, 3) with the trailing edge (1b) of the horizontal wall portion (1).

In the embodiment of the invention illustratively presented in FIG. 1, wherein both the horizontal wall portion (1) and the lateral wall portions (2, 3) have an airfoil section, the airfoil section (a) of the horizontal wall portion (1) and/or the airfoil section (b) of the lateral wall portions (2, 3) comprises a duct-internal surface (10) and/or duct-internal surfaces (20, 30) respectively with a convex configuration, and a duct-external surface (11) of the horizontal wall portion (1) and/or duct-external surfaces (21, 31) of the lateral wall portions (2, 3), which may be planar or hollow inwardly or a combination of a partly planar and a partly hollow inwardly configuration. At this point it should be noted that according to an advantageous, preferred embodiment of the invention, the trailing edge (1b) of the horizontal wall portion (1) has a downwardly directed inclination, such configuration contributing in effecting a drop of the wave making, whilst the trailing edges (2b, 3b) of the lateral wall portions (2, 3) have an outwardly directed inclination with a scope of contributing in effecting a reduction of the impact onto the bow mask of the flow exiting the duct.

According to an alternative embodiment of the invention, the specified geometrical configuration of section (a) of the horizontal wall portion (1) and/or the specified geometrical configuration of section (b) of the lateral wall portions (2, 3) is a curved plate (1') and (2', 3') respectively, arranged so that the duct-internal surface (10) of the horizontal wall portion (1) or the duct-internal surfaces (20, 30) of the lateral wall portions (2, 3) will correspond to the convex side of the curved plate (1') and (2', 3') respectively and the duct-external surface (11) of the horizontal wall portion (1) or the duct-external surfaces (21, 31) of the lateral wall portions (2, 3) will correspond to the hollow side of the curved plate (1') and (2', 3') respectively.

Figure 4:
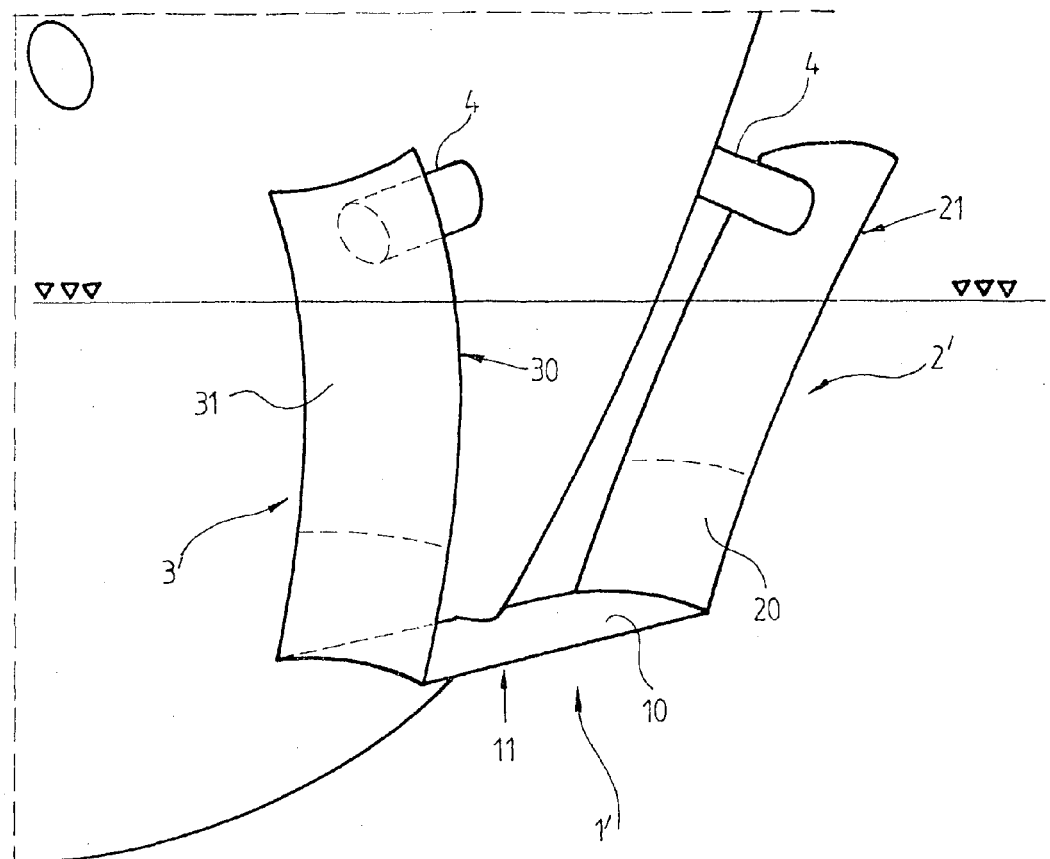
FIG. 4 illustrates an embodiment of the duct of the invention wherein both the horizontal wall portion and the lateral wall portions are curved plates.
Figure 4A:
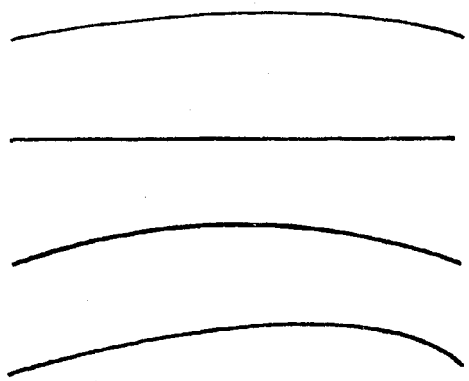
FIG. 4a shows a variety of configurations of the curved plates employed in the embodiment of the duct of the invention depicted in FIG. 4.

FIG. 4 illustratively presents an embodiment of the duct of the invention where both the horizontal wall portion and the lateral wall portions are curved plates, which as shown in FIG. 4a might have varying alternative configurations. In this case, the Center of Low Pressure (1c) of the horizontal wall portion (1) having a section (a) of a specified geometrical form in correspondence with each appropriately selected angle of attack of the flow impacting onto the upper duct-internal surface (10) thereof and/or the Centers of Low Pressure (2c, 3c) of the lateral wall portions (2, 3) at the region of connection of the lateral wall portions (2, 3) with the horizontal wall portion (1) having a section (b) of a specified geometrical form are, in correspondence with each appropriately selected angle of attack of the flow impacting onto the duct-internal surfaces (20, 30) thereof, are being arranged in the vicinity of the region of maximum convexity of the curved plate (1') and curved plates (2', 3') respectively.

Figure 5:
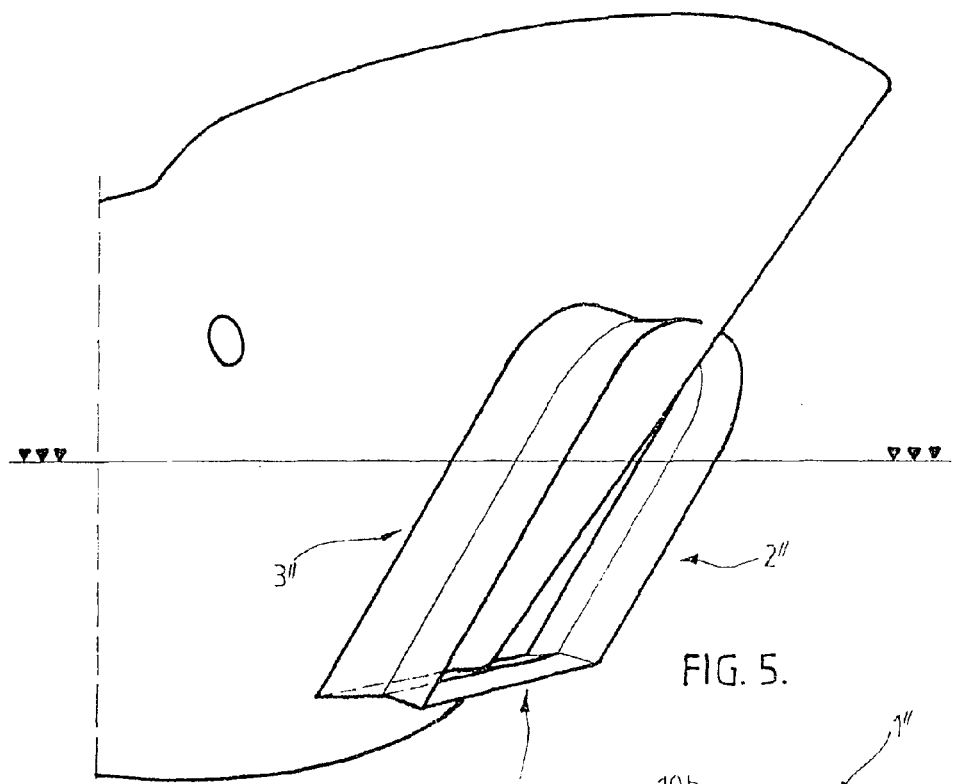
FIGS. 5 and 5a show a perspective and a sectional view respectively illustrating an embodiment of the duct of the invention wherein both the horizontal wall portion and the lateral wall portions are plates with an acute angle configuration.
Figure 5B:
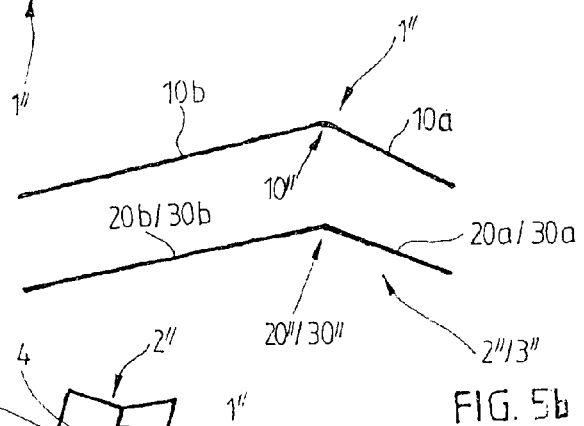
Figure 5A:
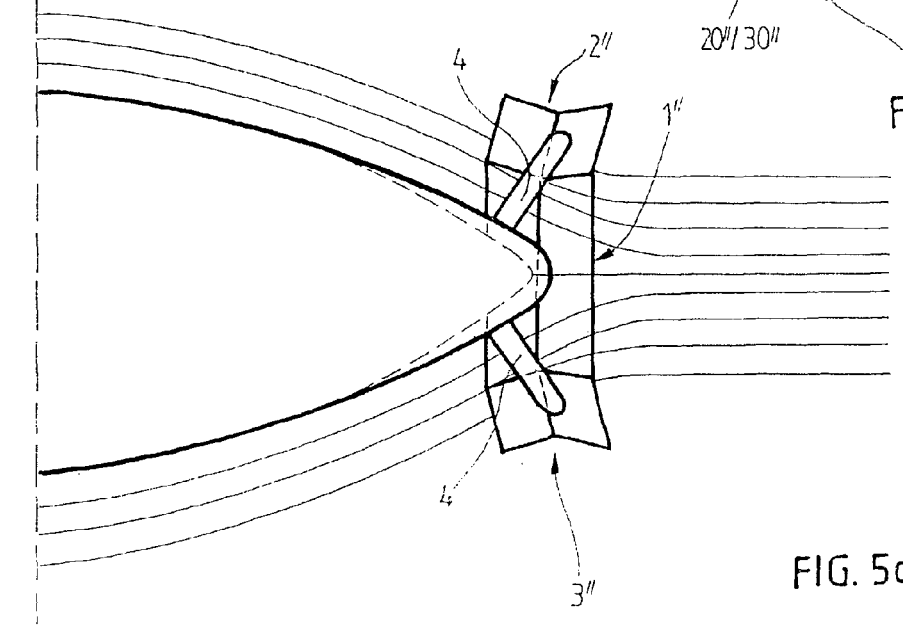

According to a further alternative embodiment of the invention, the specified geometrical configuration of the section (a) of the horizontal wall portion (1) and/or the geometrical configuration of the section (b) of the lateral wall portions (2, 3) is a plate with an acute angle section (1") and (2", 3") respectively, such plate comprising a pair of legs (10a, 10b) and (20a, 20b), (30a, 30b) respectively extending on either side of a top (10") of the horizontal wall portion (1') and tops (20"), (30") of the lateral wall portions (2", 3") respectively, such tops being the tops of the respective acute angle configurations. FIG. 5 illustrates such an arrangement of the duct of the invention where both the horizontal and the lateral wall portions are configured as acute angle sections, wherein the acute angle might take a value marginally close to 180°, whereby the acutely angled plate ends up to operate as a simple planar plate instead.

In the embodiment of the angled section of the plate of FIG. 5, the abovementioned leg (10a) of the horizontal wall portion (1") and corresponding legs (20a, 30a) of the lateral wall portions (2", 3") are being arranged at the inlet end of the flow entering the duct and the leg (10b) of the horizontal wall portion (1") and corresponding legs (20b, 30b) of the lateral wall portions (2", 3") are being arranged at the outlet end of the flow exiting the duct, wherein the legs (10a, 10b), (20a, 20b), (30a, 30b) form tops (10", 20", 30") respectively at the points of abutment thereof, wherein an angle larger than 180° within the duct and less than 180° outside the duct is being formed, wherein the Center of Low Pressure (1c) of the horizontal wall portion (1") having a section (a) of a specified geometrical form in correspondence with each appropriately selected angle of flow attack onto the duct-internal surface (10") thereof and/or the Centers of Low Pressure (2c, 3c) of the lateral wall portions (2", 3") having a section (b) of a specified geometrical form in correspondence with each appropriately selected angle of flow attack onto the duct-internal surfaces (20", 30") thereof, are being arranged in a selected position located in the vicinity of the tops (10") and (20", 30") respectively of the acute angle configuration of the acutely angled plates (1") and (2", 3") respectively.

According to one embodiment of the invention both the abovementioned duct leg (10a) disposed at the inlet end of the flow entering the duct and the duct leg (10b) disposed at the outlet end of the flow exiting the duct of the acutely angled plate (1") is either a planar plate or a plate with a small convexity.

According to a further alternative embodiment of the invention, the duct leg (10a) disposed at the inlet end of the flow entering the duct is either a planar plate or a plate with a small convexity and the duct leg (10b) disposed at the outlet end of the flow exiting the duct of the acutely angled plate (1") is an airfoil section or alternatively the duct leg (10a) disposed at the inlet end of the flow entering the duct is an airfoil section and the duct leg (10b) disposed at the outlet end of the flow exiting the duct of the acutely angled plate (1") is either a planar plate or a plate with a small convexity.

In any of the abovementioned cases of wall portions with the acutely angled plate configuration, the tops (10") and (20", 30") of the acute angle of the acutely angled plates (1") and (2", 3") respectively might take the form of a short linear portion and/or a rounded top portion with a defined convex configuration. An illustration of such alternative forms of the tops might be seen in FIG. 7a.

In either the case of use of the section of a curved plate or in the case of use of the section of an acutely angled plate, the side of the plate external to the duct, either of the specified geometrical configuration of a curved plate (1') or of the acutely angled plate (1") of the horizontal wall portion (1) and/or the side of the plate external to the duct, either of the specified geometrical configuration of a curved plate (2', 3') or of the acutely angled plate (2", 3") of the lateral wall portions (2, 3) can be left open thereby creating a hollow section in the case of a curved plate or a corresponding cavity in the case of an acutely angled plate. Alternatively it can be closed by a plate (40), which extends from the leading edge to the trailing edge as illustratively presented in FIG. 7.

In the case of the closed wall portion, the plate (40), which is employed for closing the duct-external side of the plate outside the duct of the specified geometrical shape of a curved plate (1') or of an acutely angled plate (1") of the horizontal wall portion (1) and/or the duct-external side of the plates outside the duct of the specified geometrical shape of curved plates (2', 3') or of acutely angled plates (2", 3") of the lateral wall portions (2, 3) is potentially selected to be either a planar plate (40a) or a curved plate (40b) or an acutely angled plate (40c) or a combination of the abovementioned, as illustratively shown in FIG. 7a wherein normalization of the tops in a planar or rounded form is also illustratively presented.

Figure 6A:
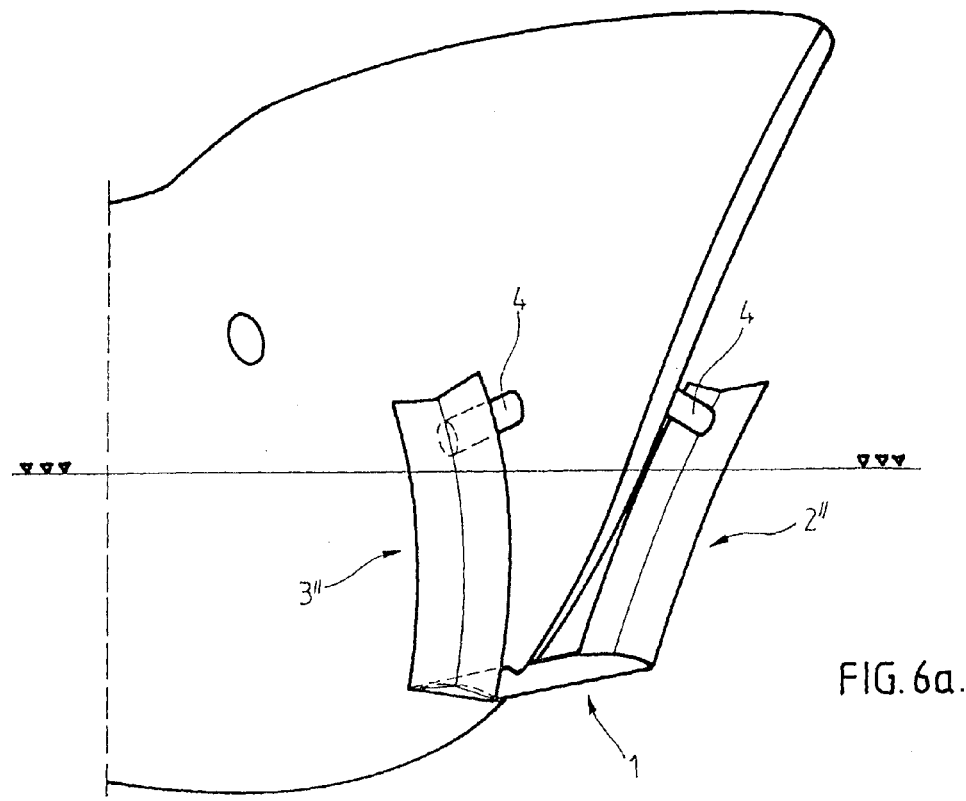
FIG. 6a presents an embodiment of the duct proposed in the present invention wherein the combination of a horizontal wall portion with an airfoil section and of lateral wall portions with an acute angle section is being selected.
Figure 6B:
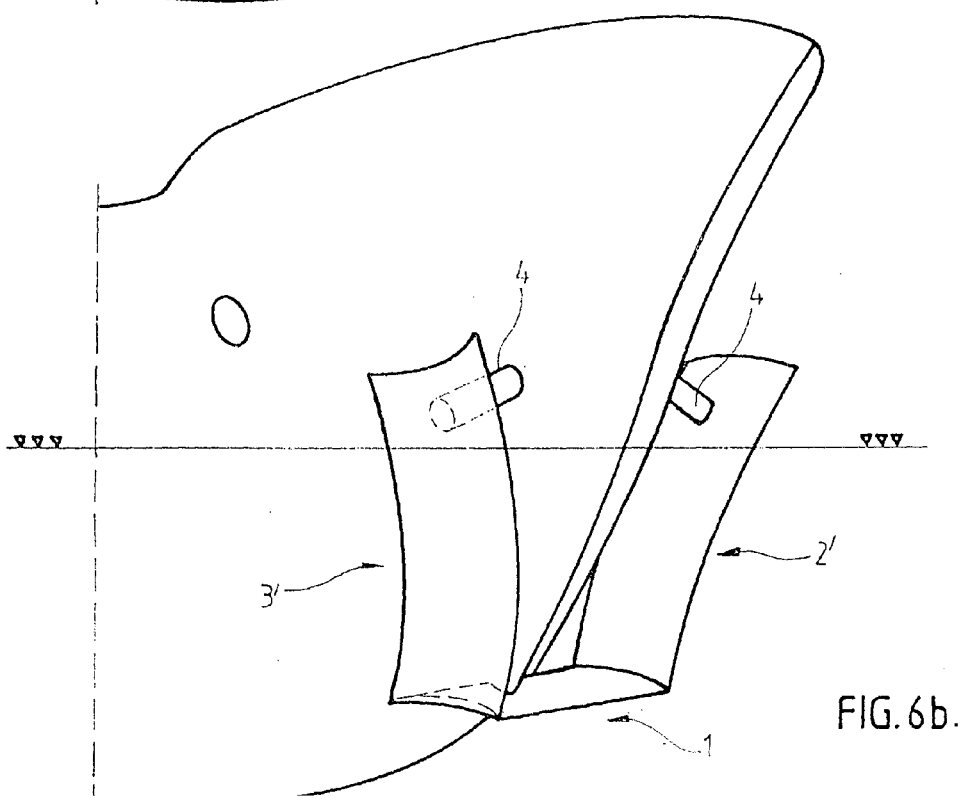
FIG. 6b presents an embodiment of the duct proposed in the present invention wherein the combination of a horizontal wall portion with an airfoil section and of lateral wall portions with a curved plate section is being selected.

According to a preferred illustrative embodiment of the invention, the duct of the invention is proposed to be implemented with a combination of a horizontal wall portion (1) with an airfoil section and lateral wall portions (2", 3") with an acutely angled section (FIG. 6a) or lateral wall portions (2', 3') with a curved plate section (FIG. 6b). It is particularly possible that various combinations in the construction of the horizontal wall portion and lateral wall portions of the duct might be selected, with a scope of optimizing the ratio of Lift to Drag coefficient ($C_L/C_D$), both for the horizontal wall portion (1) and for the lateral wall portions (2, 3) and of also optimizing the ratio ($C_{L1}/C_{L2,3}$) of the Lift coefficient $C_{L1}$ of the horizontal wall portion (1) to the ratio of Lift coefficient $C_{L2,3}$ of the lateral wall portions (2, 3), always taking in consideration the specific nominal cruising speed of the vessel and the geometry of the bow thereof.

In any of these cases of alternative combinations in the configuration of the horizontal wall portion and of the lateral wall portions, the abovementioned respectively selected suitable angle of attack for both the horizontal wall portion (1) and for the lateral wall portions (2.3) is determined for each specific hull and speed design experimentally by means of towing measurements of the vessel model being oriented at varying angles of attack with a scope of obtaining the optimum performance.

Figure 8D:
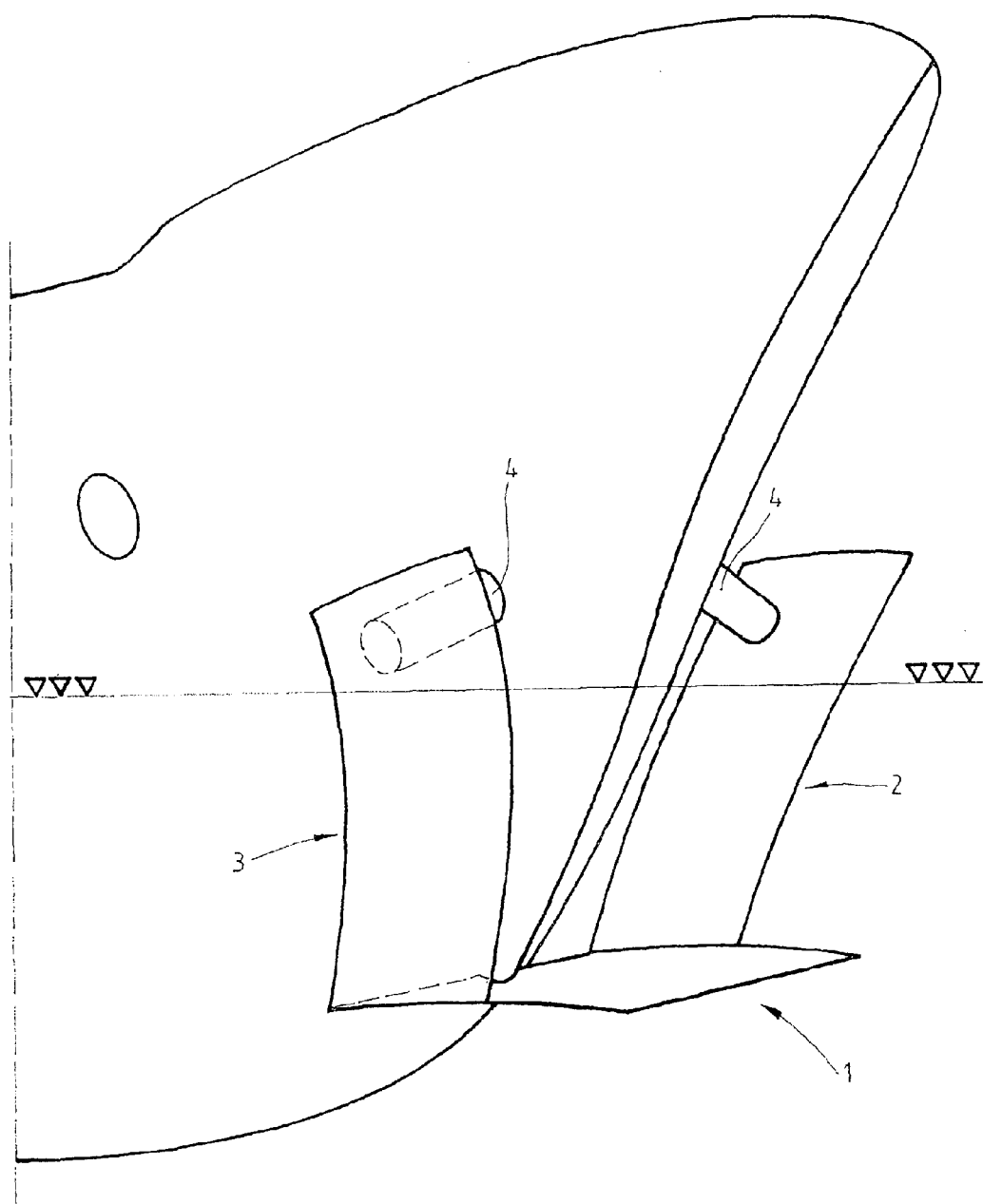

According to an embodiment of the proposed hydrodynamic duct, the length ($a_l$) of section (a) of the horizontal wall portion (1) in the direction of the flow is identical with the length ($b_l$) of section (b) of the lateral wall portions (2, 3) (FIG. 8) and the duct is arranged so that the Center of Low Pressure (1c) of the horizontal wall portion (1) may be located in the vicinity of the region of the Centers of Low Pressure (2c, 3c) of the lateral wall portions (2, 3). It is noted that always the Centers of Low Pressure (2c, 3c) are mounted forwardly of the Center of Low Pressure (1c). In the case where the horizontal wall portion and the lateral wall portions are not equal in length and either the horizontal wall portion is shorter than the lateral wall portions (FIG. 8c) or the lateral wall portions are shorter than the horizontal wall portion (FIG. 8d), extensions might be used either forwardly of the leading edge or rearwardly of the trailing edge of the relatively shorter wall portions in order to eventually obtain a duct with wall portions of equal length, however always in compliance with the requirement that the Centers of Low Pressure (2c, 3c) of the lateral wall portions (2, 3) are being located at a position forwardly of the Center of Low Pressure (1c) and up to the leading edge (1a) of the horizontal wall portion (1) or slightly beyond thereafter.

It is noted that the horizontal wall portion (1) in the direction from the stem towards the stern is being mounted in such a way that the Center of Low Pressure $C_{lp}$, of the wall portion (1) may be located in the region of generation of the first stem wave. It is noted that it is at this position of the Center of Low Pressure that, due to low pressure, the flow speed is maximum and exceeds the vessel's speed. The first stem wave is therefore subject to a higher flow speed and this results in a fall of the level of the first stem wave and in an improvement of the flow around the vessel.

It is noted that the aforementioned necessary condition for the optimization of the performance of the duct, i.e. the arrangement of the Centers of Low Pressure (2c, 3c) of the lateral wall portions (2, 3) in the region of connection thereof with the horizontal wall portion (1) in an optionally selected position between the Center of Low Pressure (1c) and the leading edge (1a) of the horizontal wall portion (1) or even projecting forwardly of the leading edge (1a) of the latter is a necessary condition because it is this position of the Centers of low pressure of the lateral wall portions that enables the lateral wall portions to contribute in the increase of the speed of the flow entering the duct and thereby supplement the function of the horizontal wall portion (1) that is to effect the fall of wave making, where the center of low pressure of the horizontal wall portion is located at the region of generation of the first stem wave. Otherwise, in case of an arrangement of the centers of low pressure (2c, 3c) of the lateral wall portions rearwardly of the center of low pressure (1c) of the horizontal wall portion (1), the lateral wall portions are unable to contribute towards enhancing the speed at the region of the center of low pressure (1c) located at the vicinity of the generation of the first stem wave; if this is the case, instead of providing a positive contribution in increasing the speed of the stem wave, the lateral wall portions might also effect generation of losses.

In an experimental arrangement for a vessel with a nominal speed of 30 knots, a conventional vertical bow and a Froyde Number (Fn)=0.44 (at such a relatively high Froyde Number (Fn) value the bulb fails to operate efficiently, whilst the duct of the invention provides an improvement), the airfoil section of the horizontal wall portion was mounted with the Center of Low Pressure $C_{lp}$ thereof located forwardly and at a distance from the bow line of the order of 10% of the length of the chord (Table 4); this was made necessary since, because of the increased speed in this embodiment, a displacement of the generation of the first stem wave occurred comparatively with tests carried out with the same airfoil section at lower speeds. However, indicatively, for the airfoil section NACA 4412, the leading edge of the airfoil for a vessel with the abovementioned speed is located at an advantageous position such that 50% of the length of the wall portion (length of the chord of the airfoil) extends forwardly of the bow, despite of the generally accepted recommendation for the point at which the bow abuts with the airfoil, in case of lower speeds and in bows of different geometry, to be located in the vicinity of the airfoil's Center of Low Pressure, $C_{lp}$. This occurs because due to the increased speed, a forward displacement of the generation of the first stem wave takes place and the center of low pressure of the airfoil has therefore to be displaced accordingly.

For vessels with a bulb that extends almost up to the waterline and speeds of 14.5 and 15.5 knots (Table 1), again the $C_{lp}$ of the airfoil section of the horizontal wall portion abuts on the stem area of the bulb having the leading edge extending at a distance of the order of 30% of the length of the chord forwardly from the point at which it abuts with the bulb, the location of the region of generation of the first stem wave being also anticipated at this same distance. Also for container vessels with a conventional bow, experimental data for which are presented in Table 3, again the center of low pressure of the horizontal wall portion is located in the vicinity of the bow and the leading edge of the airfoil section is located at a distance of the order of 40% of the length of the chord forwardly of the point of abutment of the duct onto the bow. Due to the increased speed of 20 knots, it is believed that the first stem wave is being generated at a distance forwardly of the bow line, but also the center of low pressure of the horizontal wall portion is being forwardly displaced because of the increased angle of attack(5°) and it is therefore located forwardly of the conventionally proposed location of the center of low pressure of the selected airfoil section (Wortman FX72-MS-150B), wherein for a zero angle of attack, the center of low pressure is located at the region of approximately 40% of the length of the chord. In such a way is therefore provided an encountering of the forwardly displaced first stem wave with the forwardly displaced center of low pressure of the horizontal wall portion (1). It is hereby noted that the lift coefficient of the horizontal wall portion with the selected airfoil section of the Wortman. FX72-MS-150B type is higher by a percentage of at least 50% than the lift coefficient of the lateral wall portions, which, in this specific series of tests, have been implemented with the selected airfoil section of the NACA 4412 type. The ratio $C_{L1}/C_{L2,3}$ is therefore greater or equal to 1.50. Thus, taking into consideration that the position of generation of the first stem wave is a function of the speed of the vessel and of the geometry of the bow, the determination of the position of the horizontal wall portion for the placement of the duct may be determined with a good approximation through the CFD study for the determination of the position of the vectors directed upwardly and those directed downwardly. As mentioned herein above, the placement of the horizontal wall portion of the duct should be underneath the vectors with an orientation parallel to the waterline, also including a portion of the vectors inclined downwardly. The outcome of the placement parameters outlined herein above provides a duct that advantageously improves the wave making resistance and partly the frictional resistance as well, i.e. the duct provides an improvement of both the ratios $C_w$ and $C_f$.

Alternatively, the length ($a_l$) of section (a) of the horizontal wall portion (1) oriented in the direction of water flow is less than the length ($b_1$) of section (b) of the lateral wall portions (2, 3) and the duct is being arranged so that in the region of connection of the horizontal wall portion (1) with the lateral wall portions (2, 3), the leading edge (1a) of the horizontal wall portion (1) is located at the region of the centers of low pressure (2c, 3c) of the lateral wall portions (2, 3) or rearwardly of the Centers of Low Pressure of the lateral wall portions (FIG. 8c). In the case of an unequal length of the horizontal wall portion and the lateral wall portions, it is advisable in order to ensure the maintenance of the desired differentiated flow conditions within the duct with respect to the flow outside it to obtain coincidence of the trailing edges of the horizontal wall portion and of the lateral wall portions, wherein such coincidence might be achieved with the addition of stem and/or stern plate extensions.

According to a preferred embodiment of the invention, as illustratively presented in FIG. 9, the proposed hydrodynamic duct is made so that the section (a) of the horizontal wall portion (1) includes a guide plate extension (id) projecting forwardly thereof and/or a guide plate extension (1e) projecting rearwardly thereof and/or the section (b) of the lateral wall portions (2, 3) includes guide plate extensions (2d, 3d) projecting forwardly thereof and/or guide plate extensions (2e, 3e) projecting rearwardly thereof. An illustration of various sectional views of the horizontal wall portion (1) incorporating a guide plate extension (1d) projecting forwardly thereof and/or a guide plate extension (1e) projecting rearwardly thereof is presented in FIG. 9a.

The abovementioned forwardly and/or rearwardly projecting guide plate extensions (1d, 1e) of section (a) of the horizontal wall portion (1) and/or the forwardly and/or rearwardly projecting guide plate extensions (2d-3d, 2e-3e) of section (b) of the lateral wall portions (2, 3) is a planar or curved plate, which is arranged in the direction of the chord, i.e. in the direction of the linear portion (50) that connects the leading edge with the trailing edge of the horizontal wall portion (1) and correspondingly connects the leading edge with the trailing edge of the lateral wall portions (2, 3) or at a certain inclination with respect to the direction of the linear portion (50). The linear portion (50) representing the chord is shown in the illustrative airfoil sections of FIG. 9b. Preferably the rearwardly projecting guide plate extension (1e) of section (a) of the horizontal wall portion (1) presents a downwardly directed convexity and/or the rearwardly projecting guide plate extensions (2e-3e) of section (b) of the lateral wall portions (2, 3) present a corresponding outwardly oriented convexity with a scope of advantageously effecting on one hand the fall of the wave making in as far as the horizontal wall portion (1) is concerned and on other hand the reduction of the impact of the flow exiting the duct onto the bow mask (bow sides) in as far as the lateral wall portions (2, 3) are concerned, always provided that these convexities have an appropriate configuration so as to prevent possible increase in the resistance coefficient of the wall portions. The abovementioned forwardly and rearwardly projecting guide plate extensions can be fixedly placed in alignment with the chord of the the wall portions or at an angle in relation with the chord. These extensions may alternatively be made in a movable mode, desirably entering within and incorporated in the wall portions and fully or partially projecting forwardly or rearwardly the wall portions. Further, the angle of inclination of these forwardly and rearwardly projecting guide plate extensions might be changed through suitable mechanisms known in the art.

Another significant characteristic in the design of the wall portions that form the duct of the invention is the satisfaction of the condition of the lift coefficient $C_{L1}$ of section (a) of the designed horizontal wall portion (1) will under all circumstances be equal or higher than the lift coefficient $C_{L2,3}$ of section (b) of the designed lateral wall portions (2, 3) of the duct, wherein such lateral wall portions (2, 3) might be of the same or of a different type to that of the horizontal wall portion (1). For different nominal cruising speeds of the vessel and consequent waves of different intensity being exerted on the vessel, the duct is being designed so that the ratio $C_{L1}/C_{L2,3}$ for a specific hull designed for a particular nominal speed will be increased as the cruising speed of the vessel is increased and as a result wave making is also consequently increased.

The shape of the duct as presented by a transversal duct section taken along a plane perpendicular to the waterline can be rectangular at the region of connection of the horizontal wall portion (1) with the lateral wall portions (2, 3), which are oriented perpendicularly to the horizontal wall portion (1) or it might a "U" type shape, i.e. with the horizontal wall portion (1) being connected to the lateral wall portions (2, 3) by means of curved portions. These curved portions can have the form of the airfoil section of the horizontal wall portion (1) or that of the lateral wall portions (2, 3) or the airfoil section of the horizontal wall portion (1) might gradually converge into the form of the airfoil section of the lateral wall portions (2, 3) or the curved portions might be of a form different from both the airfoil sections of the horizontal wall portion and lateral wall portions or the curved portions may take the form of curved plates, which are appropriately configured for connection to the adjacent wall portions.

The lateral wall portions can change their angle of inclination (twist) from a certain horizontal section to another horizontal section in the vertical direction depending on the bow flare, whilst maintaining a fixed distance of their trailing edges from the bow sides. The process can also be implemented whilst maintaining the trailing edge at a fixed position and appropriately moving the leading edge.

Also, both the horizontal wall portion (1) and the lateral wall portions (2, 3) can change their geometrical shape, i.e. with the airfoil section of the horizontal wall portion being gradually altered symmetrically along either side of the line of symmetry of the vessel, i.e. the center line. The airfoil section of the lateral wall portions (2, 3) might be gradually altered longitudinally along their length.

According to one embodiment of the invention the hydrodynamic stem duct of the invention may include means of control and adjustment of the angle of attack for either the horizontal wall portion (1) or the lateral wall portions (2, 3) or both, such means of control and adjustment of the angle of attack effecting regulation of the angle of attack depending on the geometry of the bow profile and the speed of the vessel. Such means of control and adjustment of the angle of attack can be realised with a conventionally known mechanical or hydraulic mechanism or other.

The angle of attack for the horizontal wall portion (1) is being adjusted with the leading edge (1a) being maintained at a fixed position and through displacement of the trailing edge (1b) thereof, wherein a negative inclination is defined as the movement of the trailing edge upwards and a positive inclination as the movement of the trailing edge downwards. According to a preferred embodiment of the invention, the value of the inclination of the trailing edge (1b) of the horizontal wall portion (1) is defined to lie within a range from −10° to +20° with the inclination value of 0° corresponding to the position where the linear portion (50) that connects the leading edge with the trailing edge, i.e. the chord, extends in a direction parallel to the direction of the keel of the vessel or of the waterline of loaded condition.

The angle of attack for the lateral wall portions (2, 3) is being adjusted through inclination of the leading edge (2a, 3a) whilst maintaining at a fixed position the trailing edge (2b, 3b), the latter defining the distance of the lateral wall portions (2, 3) from the bow sides. A negative inclination is defined as the movement of the leading edges (2a, 3a) outwardly, i.e. the moving thereof away from the bow sides and a positive inclination as the movement of the leading edges (2a, 3a) inwardly, i.e. in a direction of rapprochement to the bow sides. According to a preferred embodiment of the invention, the value of the inclination of the leading edges (2a, 3a) of the lateral wall portions (2, 3) is correspondingly defined to lie within a range from −40° to +40° for the lateral wall portions (2, 3) with the inclination value of 0° corresponding to the position where the linear portion (50) that connects the leading edge with the trailing edge, i.e. the chord, extends in a direction parallel to the sides of the bow of the vessel.

A characteristic feature of the duct of the invention is that the lateral wall portions (2, 3) follow the geometry of the bow in the direction keel-to-deck, whilst maintaining constant distances from the bow sides. Particularly, the airfoil section of the wall portions (2, 3) is oriented in a direction parallel to the waterline of the fully loaded condition of the vessel, whilst the imaginary lines passing through the successive positions of their leading edges (2a, 3a) extend in a direction parallel to the bow line, such orientation providing optimal hydrodynamic conditions for a uniform management of the flow on the sides of the bow.

The distance of the lateral wall portions (2, 3) from the bow sides of the vessel, which is defined as the distance of the trailing edge of the wall portions from the directly opposite bow side is being maintained at a fixed value, since the lateral wall portions (2, 3) are selected to have a twist appropriately corresponding to the twist of the bow sides. The specific value of this distance of the lateral wall portions (2, 3) from the bow sides of the vessel as defined herein above is dependent upon the geometry of the bow, the characteristics and the length of the wall portion and the nominal cruising speed of the vessel. Generally, the distance of the lateral wall portions (2, 3) from the bow sides of the vessel varies within a range from 0.30 m to 10.00 m.

The hydrodynamic duct is mounted on the vessel's bow in such a position that the Center of Low Pressure (1c) of section (a) of the horizontal wall portion (1) is being located in the region of generation of the first stem wave. Thus, the Center of Low Pressure (1c) of section (a) of the horizontal wall portion (1) can, with a scope of being located in the region of generation of the first stem wave, be arranged onto the bow line or at a certain distance there from, this distance depending upon the geometry of the bow and the nominal cruising speed of the vessel, wherein this distance varies within a range from a length equivalent to 10% of the length of the linear portion (50) that connects the leading edge with the trailing edge of the section (a). i.e. of the length of the chord, rearwardly of the bow line up to a length equivalent to 50% of the length of the linear portion (50) forwardly of the bow line.

Figures 10, 10A:
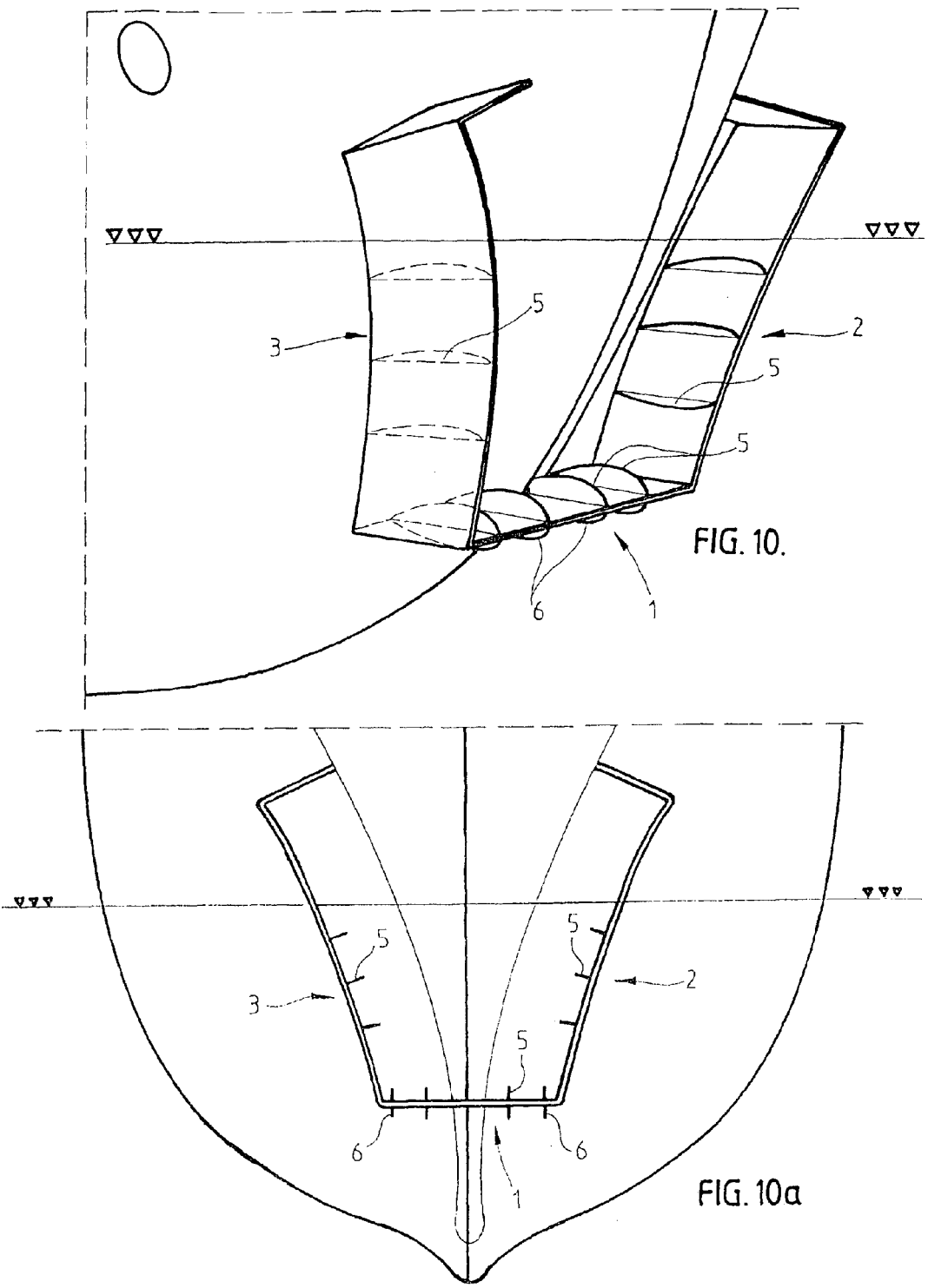
FIGS. 10 and 10a respectively present a perspective and a sectional view of an illustrative embodiment of the invention where both the horizontal and also the lateral wall portions are provided with an arrangement of protruding ribs adapted to effect optimization of laminar flow.

According to a preferred embodiment of the invention, as illustratively presented in FIG. 10, the duct-internal surface (10) within the duct of the horizontal wall portion (1) and/or of the duct-internal surfaces (20, 30) of the lateral wall portions (2, 3) is provided with an arrangement of protruding ribs (5) and/or the duct-external surface (11) and the duct-external surfaces (21, 31) outside of the duct of the same wall portions (1) and/or (2, 3) is being provided with an arrangement of protruding ribs (6), such protruding ribs (5) and/or (6) serving to optimize laminar flow characteristics of the flow coming in contact with the internal and external surfaces of the duct respectively.

Figure 11:
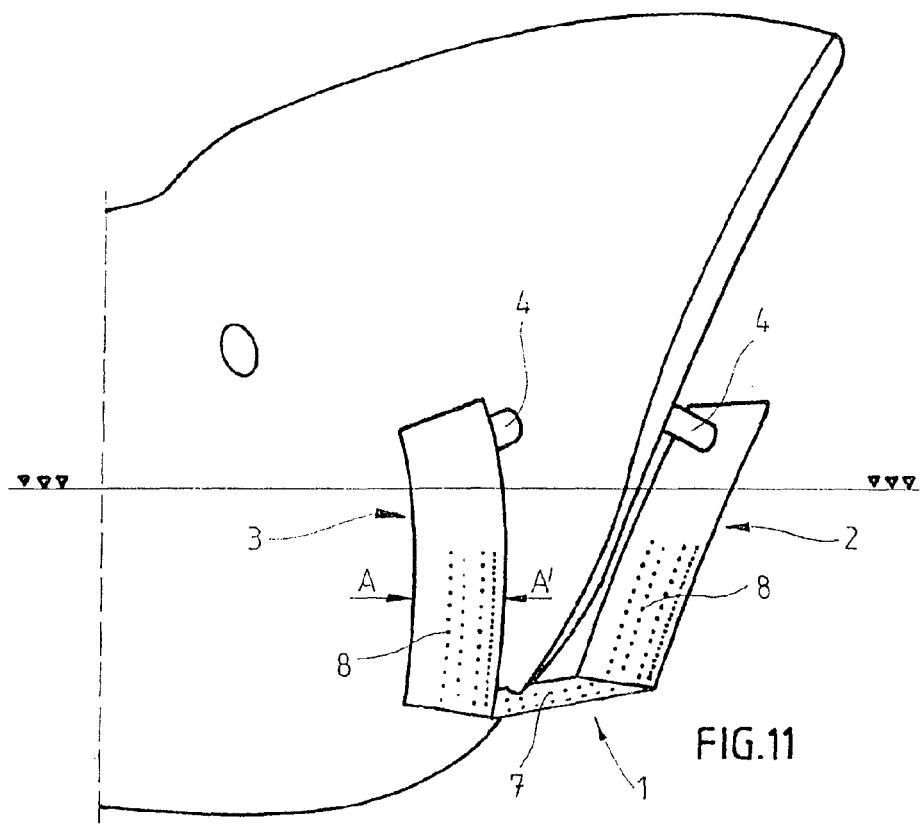
FIG. 11 presents an embodiment of the invention where both the horizontal wall portion and also the lateral wall portions are provided with air supplying thin ducts or holes.
Figure 11A:
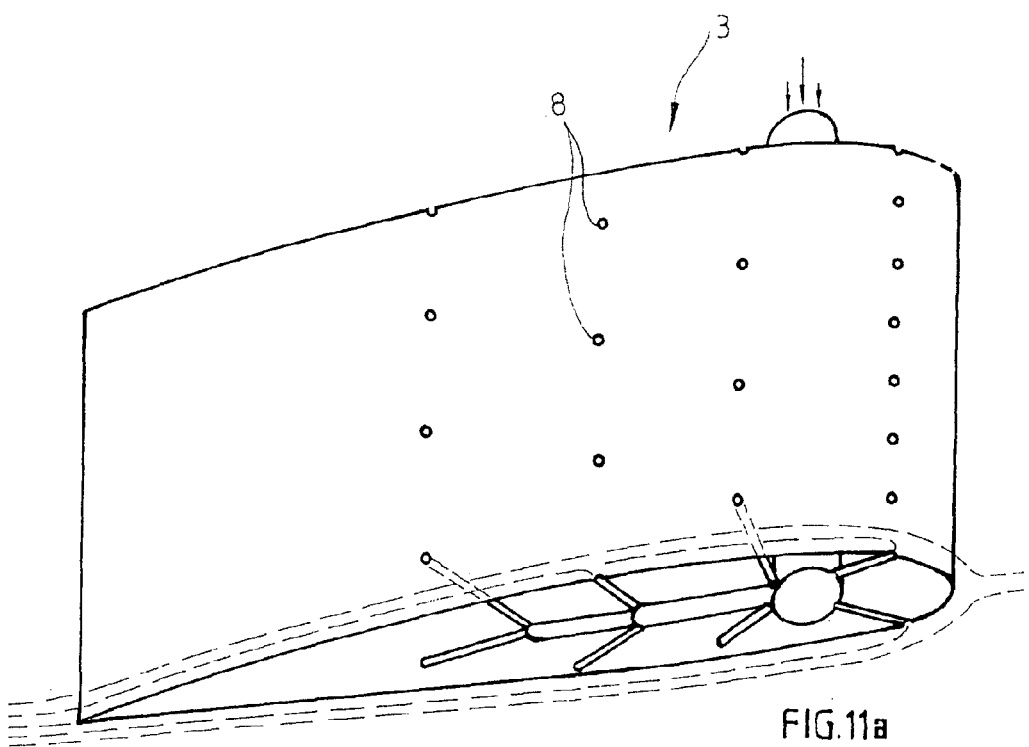
FIG. 11a presents a detail of a part of a lateral wall portion of the duct of FIG. 11 provided with air supplying thin ducts or holes.

According to yet another preferred embodiment of the invention of another improvement contributing towards optimizing laminar flow characteristics, as presented in FIG. 11, the horizontal wall portion (1) is provided with an array of appropriately arranged holes (7) and/or the lateral wall portions (2, 3) are provided with an array of appropriately arranged holes (8), wherein air is being supplied through these holes, thereby creating an air boundary layer onto the duct internal and/or duct external surfaces of the horizontal wall portion (1) and/or of the lateral wall portions (2, 3) accordingly. According to a preferred embodiment, the air supply to the horizontal wall portion and to the lateral wall portions is being provided at the leading edge thereof so that the thereby formed air boundary layer may desirably cover either only the internal surface or only the external surface or both surfaces of the wall portions. It is hereby noted that instead of the abovementioned air supply holes (7) and/or (8), thin pipes of air distribution might be attached at suitable positions of the wall portions (1) and/or (2, 3), care being taken so that they may not affect the hydrodynamic characteristics of the wall portions.

Subsequently, herewith follows presentation of four consecutive tables showing illustrative examples of tests that have been carried out in models of different types of vessels (yachts, containers, bulk carriers and frigates) equipped with the hydrodynamic duct of the invention appropriately mounted at the bow thereof. The employment of the duct of the invention apparently and definitely improves the horsepower and fuel requirements of all these types of vessels, such improvement being indicated by a substantially reduced resistance in towing the same model vessel with the duct of the invention in comparison to the resistance in towing the same model vessel at the same speed without the duct of the invention. It is thereby obvious that this measured reduction of the towing resistance or respectively of the equivalently required propulsion horsepower achieved by the placement of the duct of the invention eventually results in an advantageously lower installed horsepower and lower fuel consumption.

It is hereby noted that in the yacht model vessels, results of which appear in Table 2, the tests were performed with a self-propulsion model.

TABLE 1

OPTIMIZATION WITH THE HYDRODYNAMIC DUCT (BHDS) MOUNTED AT THE BOW
MODEL VESSEL TESTING TANK OF VIENNA
VESSEL TYPE: BULK CARRIER

| | | | | Type of profiles used | | | | | |
|---|---|---|---|---|---|---|---|---|---|
| | | | | NACA 4412 | | | NACA 4412 | | |
| | | | | Horizontal wall portion | | | Lateral wall portions | | |
| Vessel Model Type | Test Serial Number | Nominal Speed of the vessel Vs [Kn] | Vessel Towing Resistance Rtm [kg] | Distance of leading edge of the horizontal wall portion from the point of abutment at the bow line [m] | Distance of the upper surface of the horizontal wall portion from the waterline [m] | Angle of attack [deg] | Distance from the sides of the bow [m] | Inclination of lateral wall portions with respect to the line of symmetry of the vessel (center line) [deg] | Inclination of the line passing through successive leading edges of lateral wall portions to the vertical [deg] | Improvement in the Towing Resistance of the vessel Rtm [%] |
| WITHOUT BHDS | 26548-2 | 14.5 | 3306 | | | | | | | |
| WITH BHDS | 26549-2 | 14.5 | 3069 | +1.2 | 3.5 | +3 | 2.40 | 12 | | −7.2 |
| WITHOUT BHDS | 26549-3 | 15.5 | 3769 | | | | | | | |
| WITH BHDS | 26549-3 | 15.5 | 3534 | +1.2 | 3.5 | +3 | 2.40 | 12 | | −6.2 |

| Scale = 30:1 | Model Vessel | Actual Vessel |
|---|---|---|
| Length between Perpendiculars (Lpp) = | 5.88 m | 187.98 m |
| Vessel beam = | 1.01 m | 30.44 m |
| Draught = | 0.36 m | 10.90 m |
| Length of airfoil section of the hydrodynamic duct = 3.60 m | | |

TABLE 2

OPTIMIZATION WITH THE HYDRODYNAMIC DUCT (BHDS) MOUNTED AT THE BOW
MODEL VESSEL TESTING TANK OF VIENNA
VESSEL TYPE: YACHTS

| | | | | Type of profiles used | | |
|---|---|---|---|---|---|---|
| | | | | NACA 4412 | | NACA 4412 |
| | | | | Horizontal wall portion | | |
| Vessel Model Type | Test Serial Number [ ] | Nominal Speed of the vessel Vs [Kn] | Horsepower required for the propulsion of the vessel [KW] | Distance of leading edge of the horizontal wall portion from the point of abutment at the bow line [m] | Distance of the upper surface of the horizontal wall portion from the waterline [m] | Angle of attack [deg] |
| WITHOUT BHDS | 28181 | 14 | 884 | | | |

TABLE 2-continued

OPTIMIZATION WITH THE HYDRODYNAMIC DUCT (BHDS) MOUNTED AT THE BOW
MODEL VESSEL TESTING TANK OF VIENNA
VESSEL TYPE: YACHTS

| WITH BHDS | 28416-06 | 14 | 765 | +0.688 | 1.25 | +3 |
| WITHOUT BHDS | 28181 | 15 | 1567 | | | |
| WITH BHDS | 28716-05 | 15 | 1348 | +0.688 | 1 25 | +3 |

| | | Lateral wall portions | | | |
|---|---|---|---|---|---|
| Vessel Model Type | | Distance from the sides of the bow [m] | Inclination of lateral wall portions with respect to the line of symmetry of the vessel (center line) [deg] | Inclination of the line passing through successive leading edges of lateral wall portions to the vertical [deg] | Improvement in the Horsepower required for the propulsion of the vessel [%] |
| WITHOUT BHDS | | | | | |
| WITH BHDS | | 0.9 | +12 | 35 | −13.5 |
| WITHOUT BHDS | | | | | |
| WITH BHDS | | 0.9 | +12 | 35 | −14 |

| Scale = 8:1 | Model Vessel | Actual Vessel |
|---|---|---|
| Length between Perpendiculars (Lpp) = | 4.43 m | 35.42 |
| Vessel beam = | 0.93 m | 7.40 m |
| Draught = | 0.33 m | 2.60 m |
| Length of airfoil section of the hydrodynamic duct = 1.0 m | | |

TABLE 3

OPTIMIZATION WITH THE HYDRODYNAMIC
DUCT (BHDS) MOUNTED AT THE BOW*
MODEL VESSEL TESTING TANK OF POTSDAM (BERLIN)
VESSEL TYPE: CONTAINER SHIP

| Vessel Model Type | Test Serial Number | Length of the horizontal wall portion (mm) | Angle of attack of the horizontal wall portion (deg) | Length of lateral wall portions (mm) | Angle of attack of lateral wall portions (deg) | Distance of leading edge of the horizontal wall portion from the point of abutment at the bow line C(%) |
|---|---|---|---|---|---|---|
| WITHOUT BHDS | 11W0475 | | | | | |
| WITH BHDS | 11W0496 | 100 | +5 | 100 | +8.5 | 40 |
| WITHOUT BHDS | 11W0475 | | | | | |
| WITH BHDS | 11W0491 | 100 | +5 | 100 | +8.5 | 40 |

| Vessel Model Type | Draught of the upper surface of the horizontal wall portion (m) | Distance of trailing edges of lateral wall portions from the sides of the vessel (m) | SPEED (KNOTS) | Towing Resistance of the vessel [N] | Improvement In the Towing Resistance of the vessel Rtm (%) |
|---|---|---|---|---|---|
| WITHOUT BHDS | | | 18 | 31.9 | |

TABLE 3-continued

OPTIMIZATION WITH THE HYDRODYNAMIC
DUCT (BHDS) MOUNTED AT THE BOW*
MODEL VESSEL TESTING TANK OF POTSDAM (BERLIN)
VESSEL TYPE: CONTAINER SHIP

| | | | | | |
|---|---|---|---|---|---|
| WITH BHDS | 3.5 | 2.0 | 18 | 30.4 | −4.70 |
| WITHOUT BHDS | | | 20 | 42.49 | |
| WITH BHDS | 3.5 | 2.0 | 20 | 40.42 | −4.87 |

| Scale = 36:1 | Model Vessel | Actual Vessel |
|---|---|---|
| Length between Perpendiculars (Lpp) = | 5.161 m | 185.8 m |
| Vessel beam = | 0.8944 m | 32.2 m |
| Draught = | 0.2777 m | 10.00 m |
| Length of airfoil section of the hydrodynamic duct = | 100 mm | 3.60 m |

*Airfoil Wortman FX 72-MS-150B for the horizontal wall portion and NACA 4412 for the lateral wall portions

TABLE 4

OPTIMIZATION WITH THE HYDRODYNAMIC
DUCT (BHDS) MOUNTED AT THE BOW*
MODEL VESSEL TESTING TANK OF POTSDAM (BERLIN)
VESSEL TYPE: FRIGATE

| Vessel Model Type | Test Serial Number | Length of the horizontal wall portion (mm) | Angle of attack of the horizontal wall portion (deg) | Length of lateral wall portions (mm) | Angle of attack of lateral wall portions (deg) | Distance of leading edge of the horizontal wall portion from the point of abutment at the bow line C(%) |
|---|---|---|---|---|---|---|
| WITHOUT BHDS | 10W0200 | | | | | |
| WITH BHDS | 10W0197 | 100 | 0 | 100 × 3 | +4.3 | 50 |

| Vessel Model Type | Draught of the upper surface of the horizontal wall portion (m) | Distance of trailing edges of lateral wall portions from the sides of the vessel (m) | SPEED (KNOTS) | Towing Resistance of the vessel [N] | Improvement In the Towing Resistance of the vessel Rtm (%) |
|---|---|---|---|---|---|
| WITHOUT BHDS | | | 30 | 178.65 | |
| WITH BHDS | 3.0 | 3.50 | | 173.98 | −2.6 |

| Scale = 20:1 | Model Vessel | Actual Vessel |
|---|---|---|
| Length between Perpendiculars (Lpp) = | 5.6 m | 112 m |
| Vessel beam = | 0.74 m | 14.8 m |
| Draught = | 0.21 m | 4.20 m |
| Length of airfoil of stem hydrodynamic duct = | 100 mm | 2.00 m |

*airfoil section NACA 4412 for the horizontal wall portion and plates with a thickness of 3 mm and a length of 100 mm for the lateral wall portions Tests for Stability to the Wave Making The tests for the vessels maintaining stability in wave making (SEA. KEEPING TESTS) that were performed with and without the stem hydrodynamic duct (model 2306B11, Test Serial number 28180) have generally exhibited fewer movements on the wave for the model vessel equipped with the duct, reductions at the heavy and/or the pitch up to 25% and reductions in the accelerations of the bow (verticals) by 50% in wave making of 5-6 Beaufort and 20% in wave making of 7 Beaufort. The above results are described in the report 2306/01 signed by K. Richard. Ansbock on 24.4.2008 for the yacht model 2306 (wave making/model 8) that was tested in Vienna.

Tests for Stability in Travelling

The travelling of the model in a very short course employing the duct of the invention mounted at the bow thereof provides results of maintaining steady course and stability and this was proved through delimited positions of the steering wheel at 10° right-10° left with a positive result as the model reverted to its original course, whilst the model without the duct of the invention exhibited deviation from the original course thereof.

It is clear that the above results can be improved in the course of development of commercial applications of the duct of the invention also taking in consideration the general principle of optimization of results in real scale size (scale effect).

It should be noted herein that the description of the invention was made by reference to examples of illustrative and not restrictive embodiments. Thus any change or modification in the shape, size, configuration, dimensions, materials and equipment used in manufacturing and assembly, as well as the applicable design parameters of the proposed hydrodynamic duct for different types of vessels having different geometrical configuration of the bow and different nominal speeds will be considered part of the scope of the invention, as summarized in the following claims:

The invention claimed is:

1. A hydrodynamic duct mounted at a bow of a vessel in a position to be immersed in water comprising a horizontal wall portion (1) having a leading edge (1a) and a trailing edge (1b), the horizontal wall portion (1) extending outwardly from both sides of the bow and having an internal surface (10) within the duct and an external surface (11) outside of the duct, a pair of vertically extending lateral wall portions (2, 3) connected to the horizontal wall portion (1) and extending upwardly therefrom on either side of the bow thereby forming together with the horizontal wall portion (1) and with opposite surfaces of the bow, a region of flow within the duct which is differentiated from of water outside of the duct, each of the lateral wall portions (2, 3) having leading edges (2a/3a) and trailing edges (2b/2c) and internal surfaces (20, 30) within the duct and external surfaces (21, 31) outside of the duct which are connected by pillars (4) to the opposite surfaces of the bow, the lateral wall portions having a length between the leading edges and the trailing edges thereof such that the trailing edges are coincident with the trailing edge (1b) of the horizontal wall portion (1), wherein the horizontal wall portion (1) and the lateral wall portions (2, 3) are arranged with their leading edges (1a) and (2a, 3a), respectively, at a front end of the duct where water flow enters the duct and their trailing edges (1b) and (2b, 3b), respectively, at a rear end of the duct where water flow exits the duct, and wherein a position of a Center of Low Pressure (1c) located along the internal surface (10) of of the horizontal wall portion (1) is along or marginally forwardly of a bow line and wherein a position of a Center of Low Pressure (2c, 3c) located along the internal surfaces (20, 30) of the lateral wall portions (2, 3) in a region of connection of the lateral wall portions (2, 3) with the horizontal wall portion (1) is between the Center of Low Pressure (1c) and the leading edge (1a) of the horizontal wall portion (1) or projecting forwardly beyond the leading edge (1a).

2. The hydrodynamic duct of claim 1, wherein a geometrical cross sectional shape of the horizontal wall portion (1) and a geometrical cross sectional shape of the lateral wall portions (2, 3) is an airfoil section arranged with the leading larger edges (1a) and (2a, 3a) thereof at the front end of the duct and the trailing edges (1b) and (2b, 3b) thereof at the rear end of the duct.

3. The hydrodynamic duct of claim 2, wherein the internal surface (10) of the horizontal wall portion (1) and the internal surfaces (20, 30) of the lateral wall portions (2, 3) are convex and the external surface (11) of the horizontal wall portion (1) and external surfaces (21, 31) of the lateral wall portions (2, 3), include concave portions.

4. The hydrodynamic duct of claim 1, wherein the geometrical cross sectional shape of the horizontal wall portion (1) and geometrical cross sectional shape of the lateral wall portions (2, 3) is a curved plate (1') and curved plates (2', 3'), respectively, said curved plate (1') and curved plates (2', 3') being arranged so that the duct internal surface (10) of the horizontal wall portion (1) and internal surfaces (20,30) of the lateral wall portions (2, 3) correspond to a convex side of the curved plate (1') and curved plates (2', 3'), respectively.

5. The hydrodynamic duct of claim 4, wherein a plate (40) closes the duct external side of the curved plate (1') or of the acutely angled plate (1") of the horizontal wall portion (1) and/or the duct-external side of the curved plates (2', 3') or of the acutely angled plates (2", 3 ") of the lateral wall portions (2, 3), the plate (40) extending from the leading edge to the trailing edge of the duct-external side of the curved plate (1') or of the acutely angled plate (1") of the horizontal wall portion (1) and/or the duct-external side of the curved plates (2', 3') or of the acutely angled plates (2", 3") of the lateral wall portions (2, 3).

6. The hydrodynamic duct of claim 5, wherein the plate (40) is selected from a group consisting of a planar plate (40a), a curved plate (40b) an acutely angled plate (40c), and combinations thereof.

7. The hydrodynamic duct of claim 1, wherein a geometrical cross sectional of the horizontal wall portion (1) and the geometrical cross sectional shape of the lateral wall portions (2, 3) is an acutely angled plate (1") and (2",3"), respectively, with a set of two legs (10a, 10b) and (20a, 20b), (30a, 30b) extending on either side of a top (10") of the horizontal wall portion (1) and on either side of tops (20"), (30") of the lateral wall portions (2, 3),respectively, the leg (10a) and corresponding legs (20a, 30a) being disposed at the front end of the duct and the leg (10b) and corresponding legs (20b,30b) being disposed at the rear end of the duct, the legs (10a,10b), (20a,20b), (30a,30b) forming at the corresponding tops (10", 20", 30") an angle larger than 180° within the duct and an angle less than 180° outside the duct, wherein the Center of Low Pressure (1c) of the horizontal wall portion (1) and the Centers of Low Pressure (2c,3c) of the lateral wall portions (2, 3) is in the top (10") and of the tops (20", 30") of the acutely angled plates (1") and (2", 3"), respectively.

8. The hydrodynamic duct of claim 7, wherein both the leg (10a) of the acutely angled plate (1") and the leg (10b) of the acutely angled plate (1") are generally planar plates.

9. The hydrodynamic duct of claim 7, wherein one of the leg (10a) of the acutely angled plate (1") and the leg (10b) of the acutely angled plate (1") is a plate with an airfoil cross section and the other of the leg (10a) and the leg (10b) is a generally planar plate.

10. The hydrodynamic duct of claim 7, wherein the tops (10") and (20", 30") of the acutely angled plate (1") and (2", 3"), respectively, take the form of one of a linear portion and a rounded angle.

11. The hydrodynamic duct of claim 1, wherein the horizontal wall portion (1) and lateral wall portions (2, 3) exhibit a lift to drag ratio $C_L/C_D$ having values as high as possible both with respect to the horizontal wall portion (1) and with respect to the lateral wall portions (2, 3) and the requirement of optimization of the ratio of the lift coefficient $C_{L1}$ of the horizontal wall portion (1) to the lift coefficient $C_{L2,3}$ of the lateral wall portions (2, 3) $C_{L1}/C_{L2,3}$ being >1.00.

12. The hydrodynamic duct of claim 1, wherein a length $(a_l)$ of a cross section of the horizontal wall portion (1) in a direction of flow coincides with a length $(b_l)$ of a cross section of the lateral wall portions (2, 3) and wherein the duct is arranged so that at a region of connection of the lateral wall portions (2, 3) with the horizontal wall portion (1), the center of low pressure (1*c*) is located in a vicinity of the centers of low pressure (2*c*, 3*c*).

13. The hydrodynamic duct of claim 1, wherein a length of a cross section of the horizontal wall portion (1) in a direction of flow is less than the length ($b_l$) of a cross section of the lateral wall portions (2, 3) and the duct is arranged so that, at a region of connection of the lateral wall portions (2, 3) with the horizontal wall portion (1), the leading edge (1*a*) of the horizontal wall portion (1) is located in a vicinity of the Centers of Low Pressure (2*c*, 3*c*) of the lateral wall portions (2, 3).

14. The hydrodynamic duct of claim 1, wherein when the horizontal wall portion (1) has a length different to the length of the lateral wall portions (2, 3), the duct further comprises at least one of forward or rearward projecting guide plate extensions for equalizing the length of the horizontal wall portion (1) to the length of the lateral wall portions(2, 3).

15. The hydrodynamic duct of claim 14, wherein the forwardly and/or rearwardly projecting guide plate extension (1*d*, 1*e*) of the horizontal wall portion (1) and/or the forwardly and/or rearwardly projecting guide plate extensions (2*d*-3*d*, 2*e*-3*e*) of the lateral wall portions (2, 3) is a plate arranged in a direction of a linear portion (50) that connects the leading edge with the trailing edge of the horizontal wall portion (1).

16. The hydrodynamic duct of claim 15, wherein the forwardly and/or rearwardly projecting guide plate extension (1*d*, 1*e*) of section (a) of the horizontal wall portion (1) and/or the forwardly and/or rearwardly projecting guide plate extensions (2*d*-3*d*, 2*e*-3*e*) of the lateral wall portions (2, 3) are adjustable.

17. The hydrodynamic duct of claim 1, wherein a lift coefficient $C_{L1}$, of a cross section of the horizontal wall portion (1) is under all circumstances equal to or higher than a lift coefficient $C_{L2,3}$ of a cross section of the lateral wall portions (2, 3).

18. The hydrodynamic duct of claim 1, wherein an angle of attack for the horizontal wall portion (1) is adjusted through displacement of the trailing edge (1*b*) at a negative inclination upwardly or at a positive inclination within a range from −10° to +20° with a position of 0° corresponding to the position where a linear portion (50) that connects the leading edge (1*a*) with the trailing edge (1*b*) is oriented in a direction parallel to a direction of a keel of the vessel and in that the lateral wall portions (2, 3) are adjustable through displacement of the leading edge (2*a*, 3*a*) at a negative inclination outwardly in a direction away from the opposite sides of the bow to a positive inclination inwardly in a direction of the the opposite sides of the bow, while maintaining the trailing edge (2*b*, 3*b*) at a fixed position, the displacement of the leading edge (2*a*, 3*a*) of the lateral wall portions (2, 3) lying within a range from −40° to +40° for the lateral wall portions (2, 3) with the position of 0° corresponding to the position where the linear portion (50) that connects the leading edge (2*a*, 3*a*) with the trailing edge (2*b*, 3*b*) is oriented in a direction parallel to the bow line of the vessel.

19. The hydrodynamic duct of claim 1, wherein the lateral wall portions (2, 3) follow a geometry of the bow in a keel-to-deck direction, maintaining a constant distance from the opposite sides of the bow.

20. The hydrodynamic duct of claim 19, wherein the distance of the lateral wall portions (2, 3) from the opposite sides of the bow of the vessel is defined as the distance of the trailing edges (2*b*, 3*b*) from the directly opposite bow sides, wherein the distance is fixedly constant throughout the height of the lateral wall portions (2, 3) due to the lateral wall portions having a twist corresponding to a twist of the opposite sides of the bow, the distance of the lateral wall portions (2, 3) from the opposite sides of the bow of the vessel being within a range from 0.30 to 10.00 m.

21. The hydrodynamic duct of claim 1, wherein the internal surface (10) of the horizontal wall portion (1) and the internal surfaces (20, 30) of the lateral wall portions (2, 3) include a plurality of spaced and inwardly protruding ribs (5) and (6).

22. The hydrodynamic of claim 1, wherein the horizontal wall portion (1) and the lateral wall portions (2, 3) includes a plurality of holes (7, 8) respectively, the holes (7, 8) provide an air supply onto the internal and external surfaces (10, 11) of the horizontal wall portion (1) and the internal and external surfaces (20, 30), (21, 31) of the lateral wall portions (2, 3) thereby creating an air boundary layer onto the duct internal and duct external surfaces of the horizontal wall portion (1) and of the lateral wall portions (2, 3).

\* \* \* \* \*